US006249908B1

(12) United States Patent
Stamm

(10) Patent No.: US 6,249,908 B1
(45) **Date of Patent: *Jun. 19, 2001**

(54) SYSTEM AND METHOD FOR REPRESENTING GRAPHICAL FONT DATA AND FOR CONVERTING THE FONT DATA TO FONT INSTRUCTIONS

(75) Inventor: Beat Stamm, Kirkland, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,777

(22) Filed: Mar. 27, 1998

(51) Int. Cl.[7] ..................... G06F 9/445

(52) U.S. Cl. ..................... 717/5; 717/2; 717/6; 717/9; 345/467; 345/468; 345/469; 345/509

(58) Field of Search ..................... 395/702, 704, 395/705, 706, 709; 717/5, 2, 6, 9; 345/467, 468, 469, 509

(56) References Cited

U.S. PATENT DOCUMENTS

| | | | |
|---|---|---|---|
| 5,155,805 | * 10/1992 | Kaasila | 395/169 |
| 5,583,978 | * 12/1996 | Collins et al. | 395/170 |
| 5,586,241 | * 12/1996 | Bauermeister et al. | 395/167 |
| 5,715,473 | * 2/1998 | Reed | 707/542 |

OTHER PUBLICATIONS

Joslyn et al., "Designing glyphs to exploit patterns in multidimensional datasets", ACM, pp. 198–199, May. 1995.*

Calder et al., "Glyphs: flyweight objects for user interfaces", ACM, pp. 92–101, Aug. 1990.*

Ribarsky et al., "Glyphmaker: Creating Customized Visualizations of Complex Data", IEEE, pp. 57–64, Jul. 1994.*

*FontLab Power Typography* , Copyright 1997 FontLab Developer's Group, pp. 110–111, 135–137, 361, 143–145, 185–188, 197,198, 225–240, and 255–328.

*Macromedia Fontographer User's Manual*, Version 4.1, 3rd Edition, Copyright 1996 by Macromedia, Inc., pp. 123, 351, 296–314, and 357–359.

*Microsoft TrueType Editor (TTED)—Ted User Guide* , Ted Talk Language Guide, Revision 1.0, ©1996 Microsoft Corporation, pp. 1–74.

* cited by examiner

*Primary Examiner*—Mark R. Powell
*Assistant Examiner*—Ted T. Vo
(74) *Attorney, Agent, or Firm*—Kilpatrick Stockton LLP

(57) ABSTRACT

The present invention provides a method for creating high-level language hinting instructions through the use of a graphical user interface. The present invention enables a user to generate complex font programs without requiring knowledge or experience in font programming. Graphical commands are entered by a user while editing a glyph. The graphical commands are converted into functional data and stored within a data structure that represents the edited glyph. The functional data is then compiled or translated into high-level language hinting instructions that can later be compiled to machine code. Specifically, this aspect of the present invention relieves the user of having to specify the order of the hinting instructions. The present invention also provides a method to translate high-level language hinting instructions into functional data. The functional data can then be used to update the display of the edited glyph. This aspect of the present invention allows experienced font programmers to modify a font program but still maintain the ability to graphically edit the font program.

42 Claims, 22 Drawing Sheets

SETTINGS FOR VALUES OF CONTROL POINT DATA STRUCTURE

| Field | Value |
|---|---|
| Pointer to Next Control Point | 0-x |
| Control Point Number | 0-x |
| x-coordinate | (not relevant) |
| y-coordinate | (not relevant) |
| IsOnCurvePoint | true(1)/false(0) |
| Freedom direction | → roman (0), italic (1), adjusted italic (2) |
| Rounding method | → don't round (0), round-to-grid (1), round-to-half-grid (2), round-to-double-grid (3), round-down-to-grid (4), round-up-to-grid (5) |
| Relationship type | → no relationship (0), link (1), shift (2), interpolate (3), align (4), intersect (5), stroke (6) |
| CVT category | → none (0), non-specific distance (1), straight stroke (2), round stroke (3), left side-bearing (4), right side-bearing (5) |
| Minimum distance override | |
| Min. distance to use if other than 1 pixel | pixel amount |
| CVT number | 0-x |
| Pointer to Parent Control Point | 0-x → don't override (0), override to use min distance (1), override not to use min. distance (2) |
| Move exception | pixel amount |
| List of delta exceptions | ppem size / pixel amt |

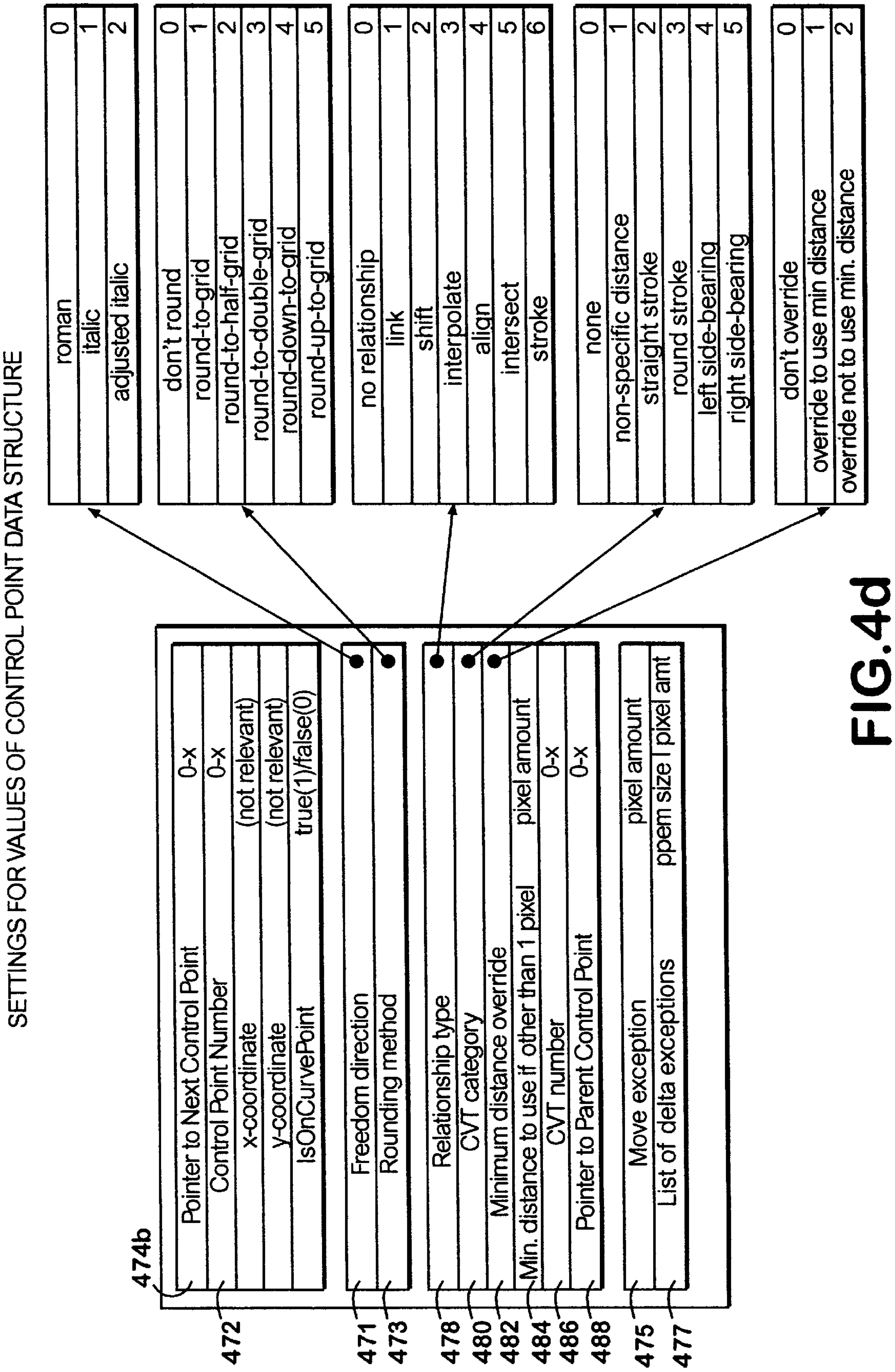

FIG. 4d

CONTROL POINT DATA STRUCTURE

570

| Ref. | Description of Field | Data Value |
|---|---|---|
| 574b | Pointer to Next Control Point | 3 |
| 572 | Control Point Number | 2 |
| | x-coordinate | (not relevant) |
| | y-coordinate | (not relevant) |
| | IsOnCurvePoint | true |
| | Freedom direction | roman |
| | Rounding method | round-to-grid |
| 578 | Relationship type | link |
| 580 | CVT category | right side-bearing |
| 582 | Minimum distance override | don't override |
| 584 | Min. distance value to use if other than 1 pixel | n/a |
| 586 | CVT number | not in Fig.5a |
| 588b | Pointer to Parent Control Point | B |
| | Move exception (pixel amount) | (empty) |
| | List of delta exceptions (pairs of the form [ppem size I pixel amount]) | (empty) |

FIG.5b

CONTROL POINT DATA STRUCTURE

670

| | Description of Field | Data Value |
|---|---|---|
| 674b | Pointer to Next Control Point | 23 |
| 672 | Control Point Number | 22 |
| | x-coordinate | (not relevant) |
| | y-coordinate | (not relevant) |
| | IsOnCurvePoint | true |
| | Freedom direction | roman |
| | Rounding method | round-to-grid |
| 678 | Relationship type | link |
| 680 | CVT category | round stroke |
| 682 | Minimum distance override | don't override |
| 684 | Minimum distance value to use if other than 1 pixel | n/a |
| 686 | CVT number | 100 |
| 688b | Pointer to Parent Control Point | 2 |
| | Move exception (pixel amount) | (empty) |
| | List of delta exceptions (pairs of the form [ppem size I pixel amount]) | (empty) |

FIG.6b

CONTROL POINT DATA STRUCTURE

770

| Ref. | Description of Field | Data Value |
|---|---|---|
| 774b | Pointer to Next Control Point | 0 |
| 772 | Control Point Number | 14 |
| | x-coordinate | (not relevant) |
| | y-coordinate | (not relevant) |
| | IsOnCurvePoint | true |
| | Freedom direction | roman |
| | Rounding method | round-to-grid |
| 778 | Relationship type | link |
| 780 | CVT category | non-specific distance |
| 782 | Minimum distance override | don't override |
| 784 | Minimum distance value to use if other than 1 pixel | n/a |
| 786 | CVT number | n/a |
| 788b | Pointer to Parent Control Point | 2 |
| | Move exception (pixel amount) | (empty) |
| | List of delta exceptions (pairs of the form [ppem size I pixel amount]) | (empty) |

FIG.7b

CONTROL POINT DATA STRUCTURE

870

| Ref. | Description of Field | Data Value |
|---|---|---|
| 874b | Pointer to Next Control Point | 8 |
| 872 | Control Point Number | 7 |
| | x-coordinate | (not relevant) |
| | y-coordinate | (not relevant) |
| | IsOnCurvePoint | true |
| | Freedom direction | roman |
| | Rounding method | round-to-grid |
| 878 | Relationship type | link |
| 880 | CVT category | left side-bearing |
| 882 | Minimum distance override | don't override |
| 884 | Minimum distance value to use if other than 1 pixel | n/a |
| 886 | CVT number | not shown in Fig. 5a |
| 888b | Pointer to Parent Control Point | A |
| | Move exception (pixel amount) | (empty) |
| | List of delta exceptions (pairs of the form [ppem size I pixel amount]) | (empty) |

FIG.8b

CONTROL POINT DATA STRUCTURE

970

| Ref. | Description of Field | Data Value |
|---|---|---|
| 974b | Pointer to Next Control Point | 15 |
| 972 | Control Point Number | 19 |
| | x-coordinate | (not relevant) |
| | y-coordinate | (not relevant) |
| | IsOnCurvePoint | true |
| | Freedom direction | roman |
| | Rounding method | round-to-grid |
| 978 | Relationship type | link |
| 980 | CVT category | straight stroke |
| 982 | Minimum distance override | don't override |
| 984 | Minimum distance value to use if other than 1 pixel | n/a |
| 986 | CVT number | 251 |
| 988 | Pointer to Parent Control Point | 7 |
| | Move exception (pixel amount) | (empty) |
| | List of delta exceptions (pairs of the form [ppem size I pixel amount]) | (empty) |

FIG.9b

CONTROL POINT DATA STRUCTURE

1071

| Ref. | Description of Field | Data Value |
|---|---|---|
| 1075b | Pointer to Next Control Point | 18 |
| 1073 | Control Point Number | 17 |
| | x-coordinate | (not relevant) |
| | y-coordinate | (not relevant) |
| | IsOnCurvePoint | true |
| | Freedom direction | roman |
| | Rounding method | round-to-grid |
| 1079 | Relationship type | link |
| 1081 | CVT category | round stroke |
| 1083 | Minimum distance override | don't override |
| 1085 | Minimum distance value to use if other than 1 pixel | n/a |
| 1087 | CVT number | 100 |
| 1089b | Pointer to Parent Control Point | 14 |
| | Move exception (pixel amount) | (empty) |
| | List of delta exceptions (pairs of the form [ppem size I pixel amount]) | (empty) |

1070

| Ref. | Description of Field | Data Value |
|---|---|---|
| 1074b | Pointer to Next Control Point | 1 |
| 1072 | Control Point Number | 0 |
| | x-coordinate | (not relevant) |
| | y-coordinate | (not relevant) |
| | IsOnCurvePoint | true |
| | Freedom direction | roman |
| | Rounding method | round-to-half-grid |
| 1078 | Relationship type | interpolate |
| 1080 | CVT category | n/a |
| 1082 | Minimum distance override | n/a |
| 1084 | Minimum distance value to use if other than 1 pixel | n/a |
| 1086 | CVT number | n/a |
| 1088b | Pointer to Parent Control Point | 17 |
| 1078' | Relationship type | interpolate |
| 1080' | CVT category | n/a |
| 1082' | Minimum distance override | n/a |
| 1084' | Minimum distance value to use if other than 1 pixel | n/a |
| 1086' | CVT number | n/a |
| 1088d | Pointer to Parent Control Point | 19 |
| | Move exception (pixel amount) | (empty) |
| | List of delta exceptions (pairs of the form [ppem size I pixel amount]) | (empty) |

FIG.10b

Single Dependency Control Point Processing for Control Point CP

| Freedom direction | Rounding Method | Relationship type | cvt category | Minimum distance override | Minimum distance value | CVT number | Pointer to parent control point | Examples |
|---|---|---|---|---|---|---|---|---|
| 0 | 0 | 2 | n/a | n/a | n/a | n/a | PP1 | XShift(PP1, CP) |
| 0 | 1 | 1 | 0 | 0 | 1 | n/a | PP1 | XDist(PP1, CP) |
| 0 | 1 | 1 | 1 | 0 | 1 | cvt | PP1 | XLink(PP1, CP,cvt) |
| 0 | 1 | 1 | 2 | 0 | 1 | cvt | PP1 | XStem(PP1,CP)<br>XLink(PP1, CP, cvt) |
| 0 | 1 | 1 | 3 | 0 | 1 | cvt | PP1 | XRound(PP1, CP)<br>XLink(PP1, CP, cvt) |
| 0 | 1 | 1 | 4 | 0 | 1 | cvt | PP1 | XLink(PP1, CP, cvt) |
| 0 | 1 | 1 | 5 | 0 | 1 | cvt | PP1 | XLink(PP1, CP, cvt) |
| 0 | 1 | 1 | 1 | 1 | 1 | cvt | PP1 | XLink(PP1, CP, cvt, >=) |
| 0 | 1 | 1 | 1 | 1 | 1.5 | cvt | PP1 | XLink(PP1, CP, cvt, >=1.5) |
| 0 | 1 | 1 | 1 | 2 | 0 | cvt | PP1 | XLink(PP1, CP, cvt<) |
| 0 | 0 | 1 | 1 | 0 | 1 | cvt | PP1 | XNoRound(CP)<br>XLink(PP1, CP, cvt) |
| 0 | 1 | 0 | n/a | n/a | n/a | n/a | n/a | XAnchor(CP) |
| 0 | 2 | 1 | 1 | 0 | 1 | cvt | PP1 | XHalfGrid(CP)<br>XLink(PP1, CP, cvt) |
| 0 | 3 | 1 | 1 | 0 | 1 | cvt | PP1 | XDoubleGrid(CP)<br>XLink(PP1, CP, cvt) |
| 0 | 4 | 1 | 1 | 0 | 1 | cvt | PP1 | XDownToGrid(CP)<br>XLink(PP1, CP, cvt) |
| 0 | 5 | 1 | 1 | 0 | 1 | cvt | PP1 | XUpToGrid(CP)<br>XLink(PP1, CP, cvt) |
| 1 | 1 | 1 | 1 | 0 | 1 | cvt | PP1 | XLink/(PP1, CP, cvt) |
| 2 | 1 | 1 | 1 | 0 | 1 | cvt | PP1 | XLink//(PP1, CP, cvt) |

FIG.11

Double Dependency Control Point Processing for Control Point CP

| Freedom direction | Rounding Method | Relationship type | cvt category | Minimum distance override | Minimum distance value | CVT number | Pointer to parent control point | Examples |
|---|---|---|---|---|---|---|---|---|
| | | 3 | n/a | n/a | n/a | n/a | PP1 | |
| 0 | 0 | 3 | n/a | n/a | n/a | n/a | PP2 | XInterpolate(PP1, CP, PP2) |
| | | 3 | n/a | n/a | n/a | n/a | PP1 | |
| 0 | 1 | 3 | n/a | n/a | n/a | n/a | PP2 | XIP Anchor (PP1, CP, PP2) |
| | | 3 | n/a | n/a | n/a | n/a | PP1 | XHalfGrid(CP) |
| 0 | 2 | 3 | n/a | n/a | n/a | n/a | PP2 | XIP Anchor (PP1, CP, PP2) |
| | | 3 | n/a | n/a | n/a | n/a | PP1 | |
| 1 | 0 | 3 | n/a | n/a | n/a | n/a | PP2 | XInterpolate/(PP1, CP, PP2) |
| | | 4 | n/a | n/a | n/a | n/a | PP1 | |
| 0 | 0 | 4 | n/a | n/a | n/a | n/a | PP2 | Align(PP1, CP, PP2) |

FIG.12

Quadruple Dependency Control Point Processing for Control Point CP

| Freedom direction | Rounding Method | Relationship type | cvt category | Minimum distance override | Minimum distance value | CVT number | Pointer to parent control point | Examples |
|---|---|---|---|---|---|---|---|---|
| | | 5 | n/a | n/a | n/a | n/a | PP1 | |
| n/a | n/a | 5 | n/a | n/a | n/a | n/a | PP2 | |
| | | 5 | n/a | n/a | n/a | n/a | PP3 | |
| n/a | n/a | 5 | n/a | n/a | n/a | n/a | PP4 | Intersect(CP, PP1, PP2, PP3, PP4) |

FIG.13

SYSTEM AND METHOD FOR REPRESENTING GRAPHICAL FONT DATA AND FOR CONVERTING THE FONT DATA TO FONT INSTRUCTIONS

TECHNICAL FIELD

The present invention relates to computer fonts and, more particularly, relates to a method for translating graphical and functional data that defines hinting constraints for a computer font into commands of a high-level hinting language.

BACKGROUND OF THE INVENTION

A font is a particular style of typeface such as Arial, Times New Roman or Courier. Fonts which conform to the TrueType Open font standard promulgated by Microsoft Corporation, assignee of the present invention, are commonly referred to as TrueType fonts. TrueType fonts contain font tables that include data, such as glyph outlines, metrics, bitmaps, and mapping information. A glyph outline is a set of mathematical data that describes the shape of the glyph. A glyph is a representation of one or more characters. A single glyph may represent a single character such as the lowercase letter "f" or a single glyph may represent a string of characters such as the ligature "fi".

To display or print a glyph, the glyph outline is first scaled to the selected font size and the resolution of the output device. The scaled glyph outline is then digitized or scan-converted to create a bitmap. Finally, the bitmap is rendered on an output device, such as a monitor or a printer, using a regularly spaced grid of picture elements ("pixels"). Scaling the glyph outline may not produce satisfactory results at all point sizes. At small point sizes, a low-resolution device may not have enough pixels to fill in the outline accurately. To compensate for the lack of pixels, hints or font instructions are added to the font to improve the appearance of the glyph. Hints typically control distances, proportions and pixel patterns.

For a TrueType font, a typographer may specify hints for the entire font or for individual glyphs using an assembly-type language. The typographer may use the low-level TrueType Instruction Set, or a high-level abstraction of the TrueType Instruction Set, such as Type Man Talk. Creating hints using one of the TrueType languages is a tedious process. To begin creating hints for a glyph, the typographer typically prints a glyph outline for the glyph. The glyph outline includes control points which define the shape of the glyph. The typographer uses the glyph outline to visualize critical relationships between the control points, such as the distance in the x-direction between two control points or the distance in the y-direction between two control points. The typographer then draws these relationships on the glyph outline using colored pencils.

Once the typographer draws the relationships on the glyph outline, the typographer translates the colored pencil markings into font instructions. The translation requires that the typographer not only convert the relationships into the proper TrueType commands, but also requires that the typographer order the commands according to the command sequence requirements of the TrueType Instruction Set. For the majority of typographers, the conversion of the relationships into TrueType commands is very tedious. It would be easier for the typographer if the relationships drawn on the glyph outline could be translated into font instructions without the typographer's intervention.

Once the typographer translates the relationships into font instructions, the font instructions are compiled and the compiled font instructions are used to display a bitmap for the glyph. The typographer reviews the bitmap to determine whether the appearance of the hinted glyph is satisfactory. If the appearance of the hinted glyph is not satisfactory, then the typographer must modify the font instructions or add additional font instructions. The typographer must repeat these steps until the appearance of the hinted glyph is satisfactory. If a typographer adds an additional font instruction, then the typographer must determine where to insert the font instruction. Because the TrueType Instruction Set requires certain command sequences, determining where to insert the additional font instruction is usually not obvious. If the additional font instruction is not inserted in the correct sequence, then the font instructions will not be correctly applied.

It would be easier to hint a glyph if the typographer could create hints that could be automatically converted into font instructions. The hints could be created using a graphical user interface and displayed on the glyph as graphical elements. As the typographer hints the glyph, the font instructions could be automatically generated from the graphical elements and then applied to the displayed glyph. If the font instructions could be automatically generated from the graphical elements, then the typographer is freed from the task of creating hinting commands. If the font instructions are applied to the glyph as the hints are created, then the typographer can easily evaluate the effects of the hints on the bitmap of the glyph.

The typographer may need to refine the hinting for a hinted glyph. If the glyph is partially hinted, then the typographer may want to maintain the existing hinting. If the typographer could graphically display the existing hints, then the typographer could add hints or refine the existing hints using the graphical user interface. In addition, graphically displaying the existing hints frees the typographer from a tedious examination of a set of font instructions created by another typographer.

One proposed solution to the hinting problem is provided by the Fontographer program marketed by Macromedia of San Francisco, Calif. The Fontographer program assists a typographer in designing a font by providing tools to support glyph outline design. The Fontographer program also provides some rudimentary hinting tools. The Fontographer program allows a typographer to specify horizontal and vertical serif hints, horizontal and vertical stem hints, and diagonal hints. For example, to specify a vertical stem hint, the typographer selects two points which define the vertical stem and then selects the "make vertical stem" command from the hints menu. The typographer may control the width of the vertical stem by specifying the x-coordinates of the stem. Typically, the x-coordinates of the stem are specified by editing the stem start and stem stop fields of a menu.

One drawback of the Fontographer program is that the hinting tools are limited. The TrueType instruction set includes many hinting instructions which are not supported by the Fontographer program. For example, the Fontographer program does not support interpolations or alignments. Another drawback of the hinting tools provided by the Fontographer program is that hints must be specified in coordinates. For a TrueType font, it is more efficient to specify a hint using a control value. A control value is a value for a dominant width, length, or angle of a group of features, such as the stem width or serif length. Control values are stored in a font table commonly referred to as a control value table ("cvt"). Some control values are specific to certain glyphs, while other control values apply to the entire font. Requiring hints to refer to control values makes it easier to preserve regularity between the glyphs of the font.

Yet another drawback of the Fontographer program is that it displays hints outside the glyph outline, making it difficult to identify the control points associated with a hint. Furthermore, Fontographer does not have a built-in rasterizer so a typographer cannot immediately see how a hint affects the appearance of a rendered glyph. Thus, it is difficult to fine-tune pixel patterns and stroke weights.

Accordingly, there is a need in the art for a method for converting graphical hints into high-level hinting instructions. There is also a need in the art for a method for converting high-level hinting instructions into graphical hints.

SUMMARY OF THE INVENTION

Advantageously, the present invention allows high-level language hinting programs to be authored by a user, without requiring the user to have any knowledge of the programming language or have any programming experience. In an exemplary embodiment, the present invention operates within an application program, such as the Visual TrueType program developed by Microsoft Corporation of Redmond Wash. The application program provides a user with a graphical interface for defining or modifying hinting information of a displayed font.

One aspect of the present invention provides a data structure for storing the hinting information for a glyph. Another aspect of the present invention provides a method for generating high-level language hinting instructions either from a graphical representation of hinting information or from a data structure of functional data representing hinting information. Another aspect of the present invention is directed towards translating high-level language hinting instructions into functional data to be stored in a data structure or graphical representations of hinting functions to be displayed on a display screen.

The data structure aspect of the present invention provides a structured method for representing hinting information. The hinting information contained in the data structure can be used to generate high-level language hinting instructions or graphical representations of hinting functions. Each glyph of a font is represented by a single data structure having various field groups or by a compound data structure having a series of linked data structures. At the highest level, a glyph is represented by a glyph data structure. Each glyph includes one or more contours. A glyph contour is represented within the compound data structure by a separate contour data structure. In an exemplary embodiment, the contour data structures are related to each other through the use of a linked list and the glyph data structure includes a pointer to the first contour data structure in the linked list.

A glyph contour includes one or more control points. Within the compound data structure, each of these control points is represented by a control point data structure. In an exemplary embodiment the control point data structures are ordered through the use of a linked list with the contour data structure including a pointer to the first control point data structure in the linked list.

The control point data structure includes several data fields for representing the hinting relationship between the control point and at least one parent control point. The contents of these data fields can be translated into hinting commands or graphical representations of a hinting function. A set of data fields is included for each parent control point included in a particular hinting relationship with the control point.

The high-level language generator aspect of the present invention operates to produce high-level language instructions from functional data. In one embodiment, the functional data may include the contents of the data fields of the previously described data structure. In another embodiment, the functional data may include graphical representations of a hinting function. In either case, each glyph of a font is represented by one or more contours with each contour including one or more control points. Further, the hinting functions applied to the glyph are represented through dependency relationships between one of the control points and one or more parent control points. This aspect of the present invention also operates to automatically ensure that the hinting instructions are ordered in accordance with the dependencies of the control points.

When generating high-level language hinting instructions or hinting commands, each of the control points of a glyph outline are visited based on a predetermined order. As mentioned above in describing the data structure aspect of the present invention, the predetermined order may be based on the linked list of control point data structures. For each control point (child), the parent of the control point is identified and then visited. If the child has two parent control points, then the parent control points are visited based on the predetermined order. This is a recursive process that operates to traverse the hierarchical tree until each of the ascendants of the child are visited. For each visited ascendant that does not have a parent (i.e., an anchor), high-level language instructions are generated to define the nature of the dependency of that anchor ascendant and the previously visited child. Once instructions have been generated defining the relationship between the anchors and their immediate descendants, then the descendants are revisited and instructions are generated to define the relationship between each of these descendant control points and their descendants. This process continues until instructions have been generated for each relationship from which the originally visited control point descends. Subsequently, this process is repeated for the next control point in the predetermined order. However, if the next control point has been previously visited, the overnext control point in the predetermined order is visited.

The functional data generator aspect of the present invention is directed towards translating high-level language hinting instructions into functional data to be stored within a data structure. Initially, a skeleton data structure is created for each glyph. Each hinting instruction is then examined and the skeleton data structure is modified in accordance with the syntax of the hinting instruction.

Thus, the present invention includes a data structure for storing functional data representing hinting information for a glyph. In addition, the present invention includes a method for translating the functional data into high-level hinting instructions. The present invention also includes a method for translating high-level hinting instructions into functional data to be stored in a data structure or displayed on a display device. These and other aspects, features, and advantages of the present invention will be more clearly understood and appreciated from a review of the following detailed description of the present invention and possible embodiments thereof, and by reference to the appended drawings and claims.

BRIEF DESCRIPTION OF THE DRAWINGS

FIG. 4*d* is a block diagram that illustrates the possible settings for various values in an exemplary data structure for a control point.

FIG. 5*b* is a block diagram that illustrates the representation of the graphical input illustrated in FIG. 5*a* in an exemplary data structure for a control point.

FIG. 6*b* is a block diagram that illustrates the representation of the graphical input illustrated in FIG. 6*a* in an exemplary data structure for a control point.

FIG. 7*b* is a block diagram that illustrates the representation of the graphical input illustrated in FIG. 7*a* in an exemplary data structure for a control point.

FIG. 8*b* is a block diagram that illustrates the representation of the graphical input illustrated in FIG. 8*a* in an exemplary data structure for a control point.

FIG. 9*b* is a block diagram that illustrates the representation of the graphical input illustrated in FIG. 9*a* in an exemplary data structure for a control point.

FIG. 10*b* is a block diagram that illustrates the representation of the graphical input illustrated in FIG. 10*a* in an exemplary data structure for a control point.

FIG. 11 is a chart diagram that illustrates the process of an exemplary embodiment of the present invention for converting graphical data for single dependencies represented within and exemplary data structure to font instructions.

FIG. 12 is a chart diagram that illustrates the process of an exemplary embodiment of the present invention for converting graphical data for double dependencies represented within and exemplary data structure to font instructions.

FIG. 13 is a chart diagram that illustrates the process of an exemplary embodiment of the present invention for converting graphical data for quadruple dependencies represented within and exemplary data structure to font instructions.

DETAILED DESCRIPTION

Figure 1:
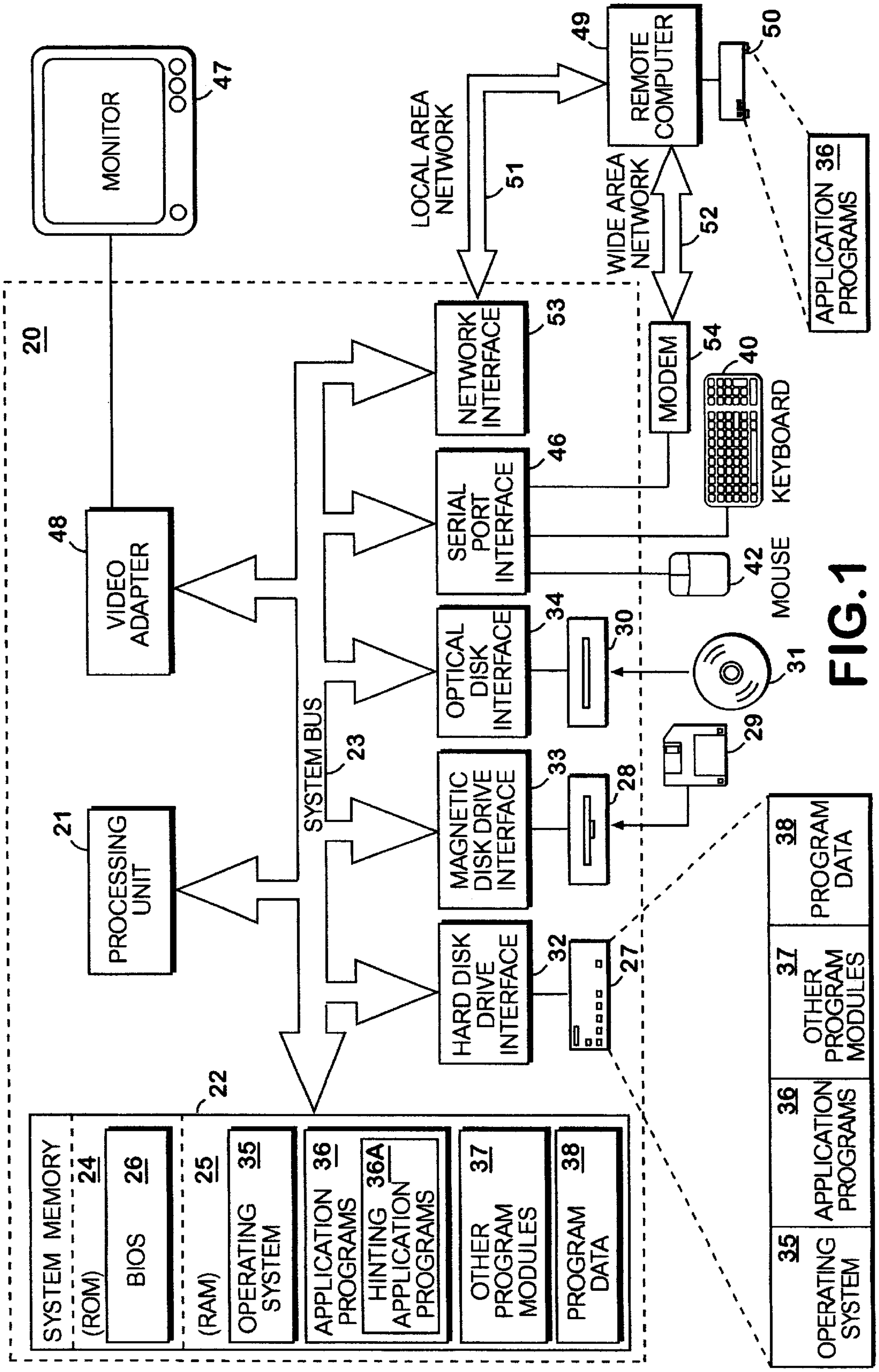
FIG. 1 is a system diagram that illustrates an exemplary environment suitable for implementing embodiments of the present invention.

The present invention is directed toward a method for representing graphical representations of hinting functions as data within a data structure, a method for translating the data within the data structure into hinting instructions, and a method for translating hinting instructions into data to be stored within the data structure.

One aspect of the present invention is to represent hinting functions for a glyph in a data structure. Another aspect of the present invention is directed towards a method for generating high-level language hinting instructions either from a graphical representation of hinting information or from a data structure of functional data representing hinting information. Another aspect of the present invention is directed towards translating high-level language hinting instruction into data to be stored in a data structure or graphical representations of hinting functions to be displayed on a display screen.

Referring now to the drawings, in which like numerals and letters represent like elements through the several figures, these aspects of the present invention and the preferred operating environment will be described.

Exemplary Operating Environment

FIG. 1 is a system diagram that illustrates an exemplary environment suitable for implementing embodiments of the present invention. FIG. 1 and the following discussion are intended to provide a brief, general description of a suitable computing environment in which the invention may be implemented. While the invention is described in the general context of an application program that runs on an operating system in conjunction with a personal computer, those skilled in the art will recognize that the invention also may be implemented in combination with other program modules or application programs as well as a combination of interacting hardware and software components.

Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary system illustrated in FIG. 1, includes a conventional personal computer 20, including a processing unit 21, system memory 22, and a system bus 23 that couples the system memory to the processing unit 21. The system memory 22 includes read only memory (ROM) 24 and random access memory (RAM) 25. The ROM 24 provides storage for a basic input/output system 26 (BIOS), containing the basic routines that help to transfer information between elements within the personal computer 20, such as during start-up. The personal computer 20 further includes a hard disk drive 27, a magnetic disk drive 28 for the purpose of reading from or writing to a removable disk 29, and an optical disk drive 30 for the purpose of reading a CD-ROM disk 31 or to read from or write to other optical media. The hard disk drive 27, magnetic disk drive 28, and optical disk drive 30 interface to the system bus 23 through a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives 27–30 and RAM 25, including an operating system 35, one or more application programs 36, other program modules 37, and program data 38. As an example, a hinting application program 36A embodying the present invention can be stored in the RAM 25. A user may enter commands and information into the personal computer 20 through a keyboard 40 and pointing device, such as a mouse 42. Other input devices (not shown) may include a microphone, joystick, track ball, light pen, game pad, scanner, camera, or the like. These and other input devices are often connected to the processing unit 21 through a serial port interface 46 that is coupled to the system bus, but may be connected by other interfaces, such as a game port or a universal serial bus (USB). A computer monitor 47 or other type of display device is also connected to the system bus 23 via an interface, such as a video adapter 48. One or more speakers 43 are connected to the system bus via an interface, such as an audio adapter 44. In addition to the monitor and speakers, personal computers typically include other peripheral output devices (not shown), such as printers and plotters.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. These types of networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
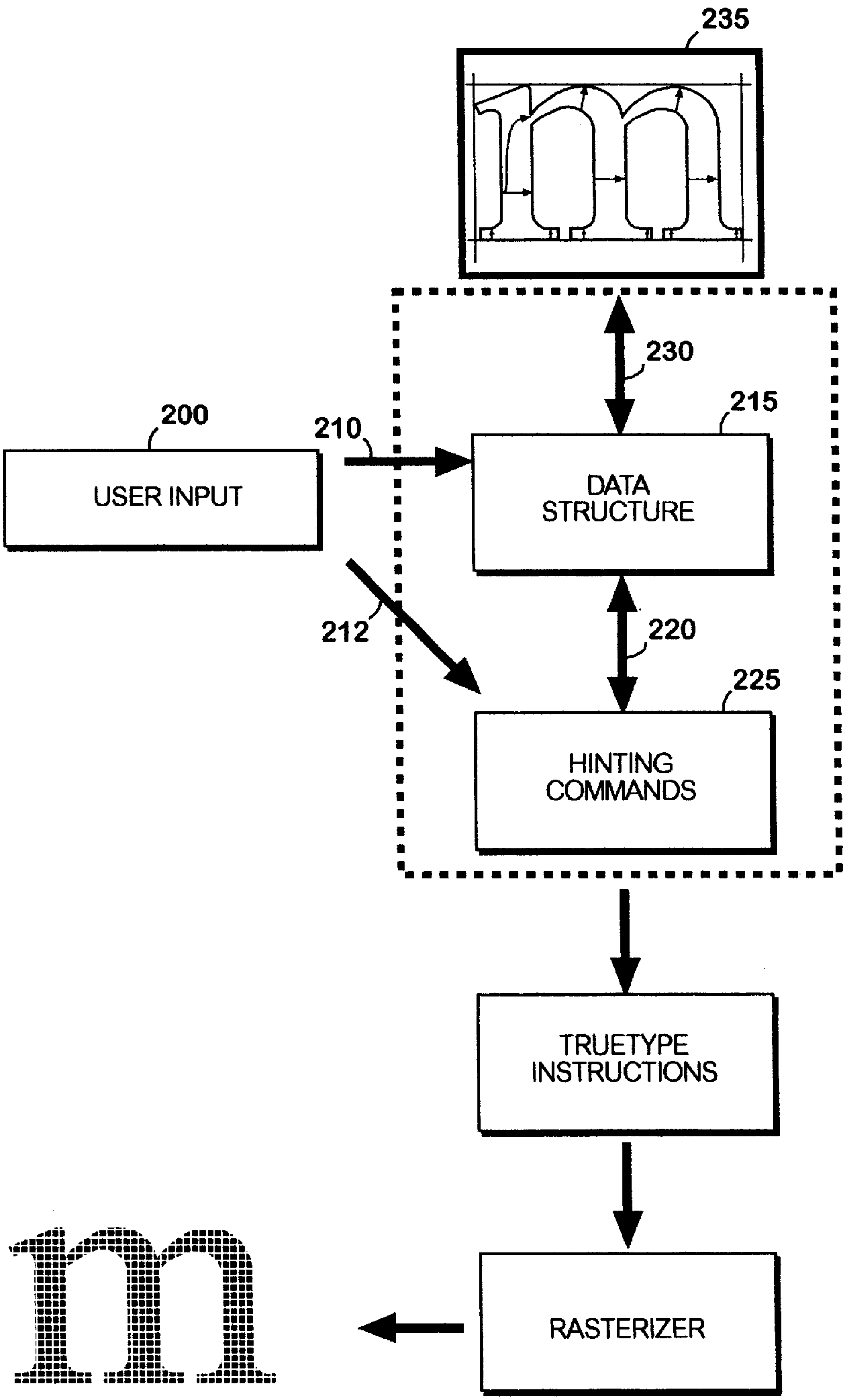
FIG. 2 is a block diagram that illustrates the operation of an exemplary embodiment of the present invention.

FIG. 2 illustrates several aspects of this invention by enclosing them within a broken line. One aspect of the present invention is the process 210 of receiving user input 200, in the form of font descriptions or data manipulation commands, and converting this graphical user input 200 to be stored within a data structure 215. Another aspect of the present invention is the process 220 of converting the representation within the data structure into high-level language hinting instructions 225 that can be then compiled to low-level instructions. Another aspect of the present invention is the process 230 of converting the representation within the data structure into graphical representations for being displayed 235. Another aspect of the present invention is the process 212 of receiving user input 200, in the form of editing commands or high-level hinting instructions. In response to receiving hinting commands or editing a hinting command, the process 220 operates to update the data structure accordingly.

Figure 3:
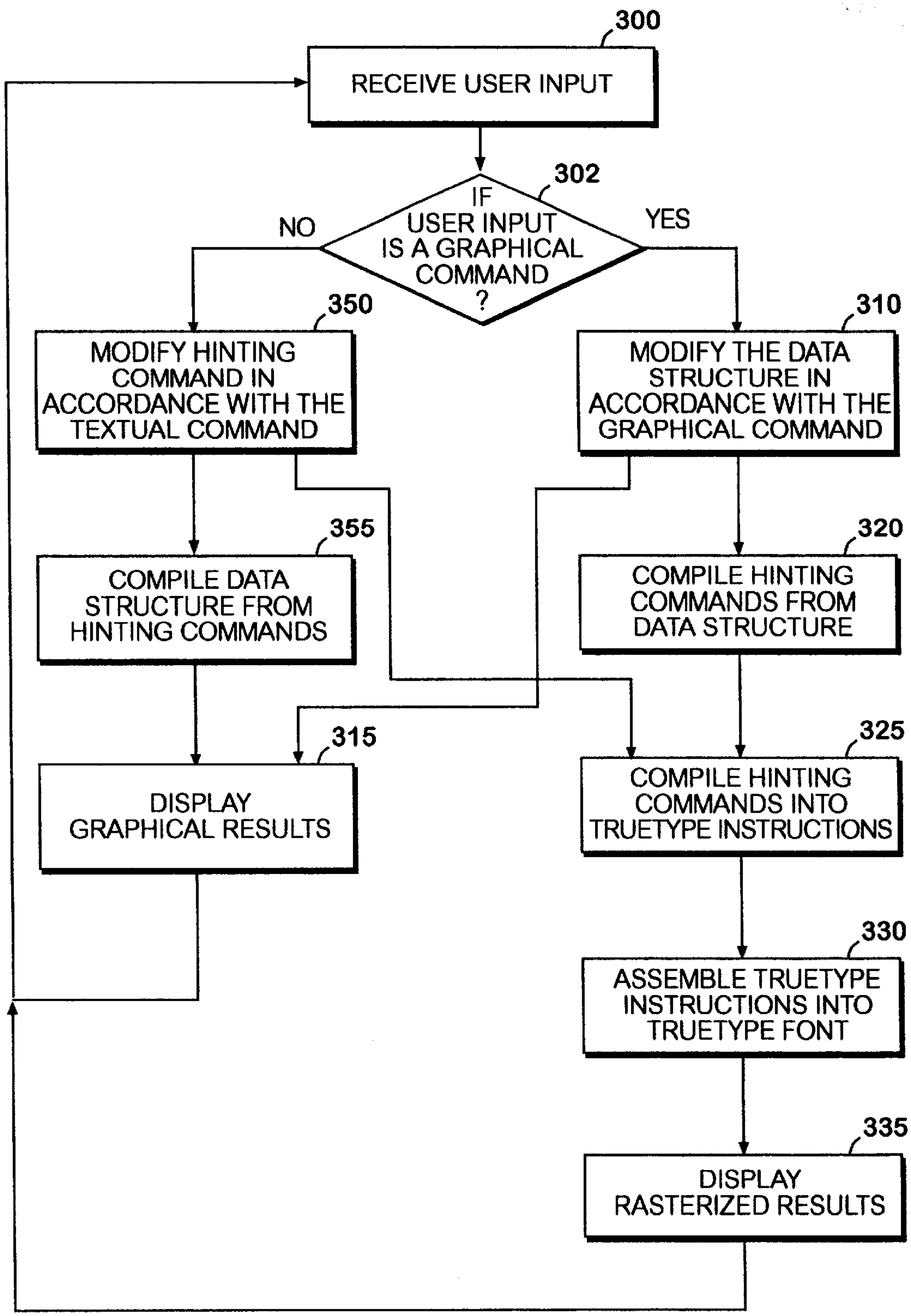
FIG. 3 is a block diagram that illustrates the high-level operation of an embodiment of the present invention.

FIG. 3 provides the general steps involved in an exemplary embodiment of the present invention. At step 300, user input is received. At step 302 the characteristic of the user input is examined. The user input may be in the form of a graphical command for modifying the relationship of a control point with one or more parent control points, or modifying other characteristics of the control point. In this first case, processing continues at step 310. Alternatively, the user input may be in the form of a textual command for modifying or adding hinting instructions. In this second case, processing continues at step 350.

At step 310, the data structure representing an entire glyph is modified in accordance with the graphical command. At step 315, the graphical results of the graphical user input are displayed on a display device. At step 320, the information stored within the data structure is compiled into high-level hinting commands. At step 325, the high-level hinting commands are compiled into TrueType instructions. At step 330, the TrueType instructions are assembled into TrueType font. At step 335, the rasterized results of the TrueType font are displayed. Processing then returns to step 300 to wait for additional user input.

At step 350, the hinting commands are modified in accordance with the textual command. At step 355, the data structure representing an entire glyph is compiled in accordance with the modified hinting commands. At step 315 the graphical results of the textual command are displayed on a display device. Processing then returns to step 300 to wait for additional user input.

Glyph Data Structure and Contour Data Structure

Figure 4A:
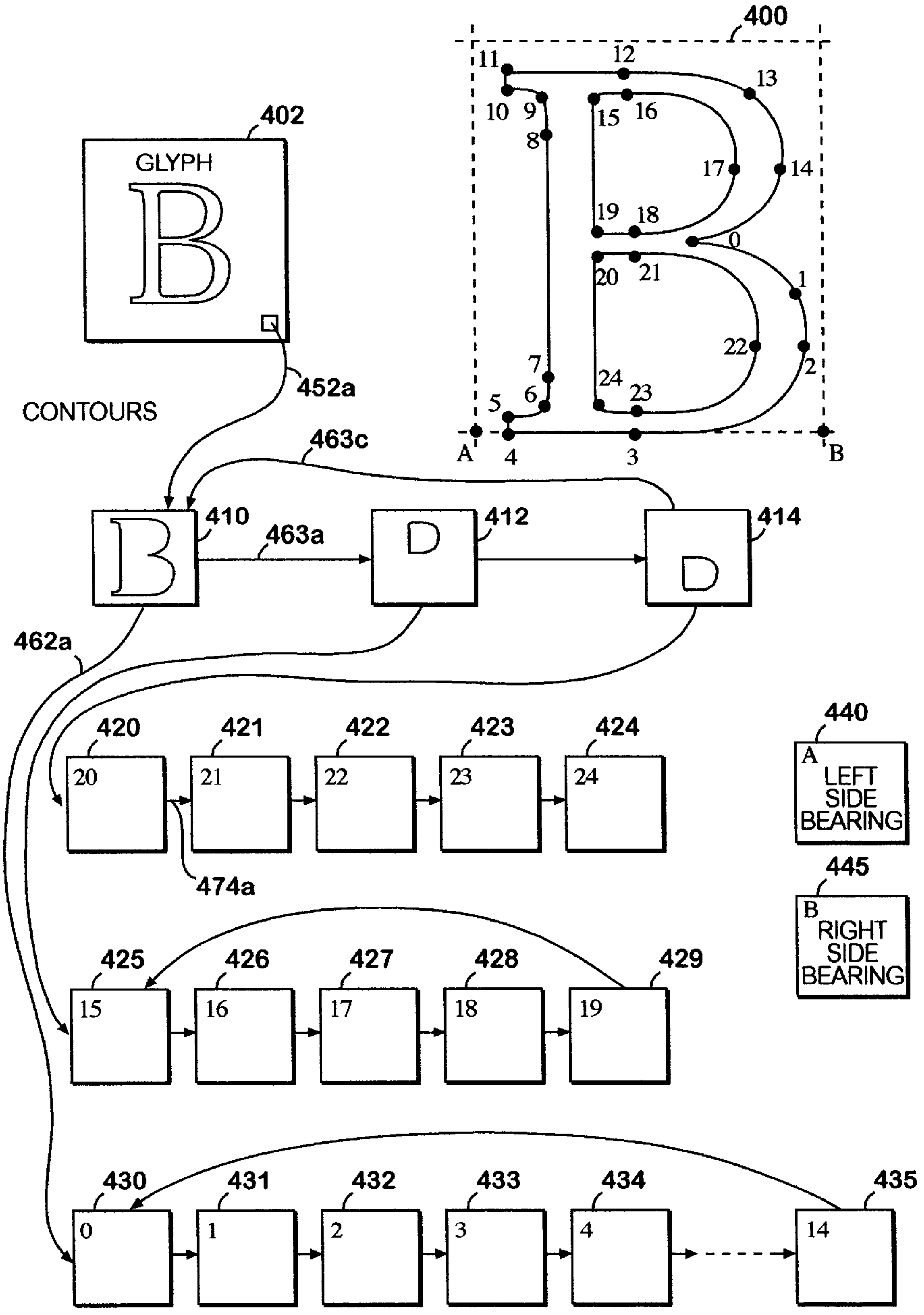
FIG. 4*a* is a diagram illustrating the relationship between a graphical representation of a font outline and an exemplary data structure representing the font outline.
Figure 4B:
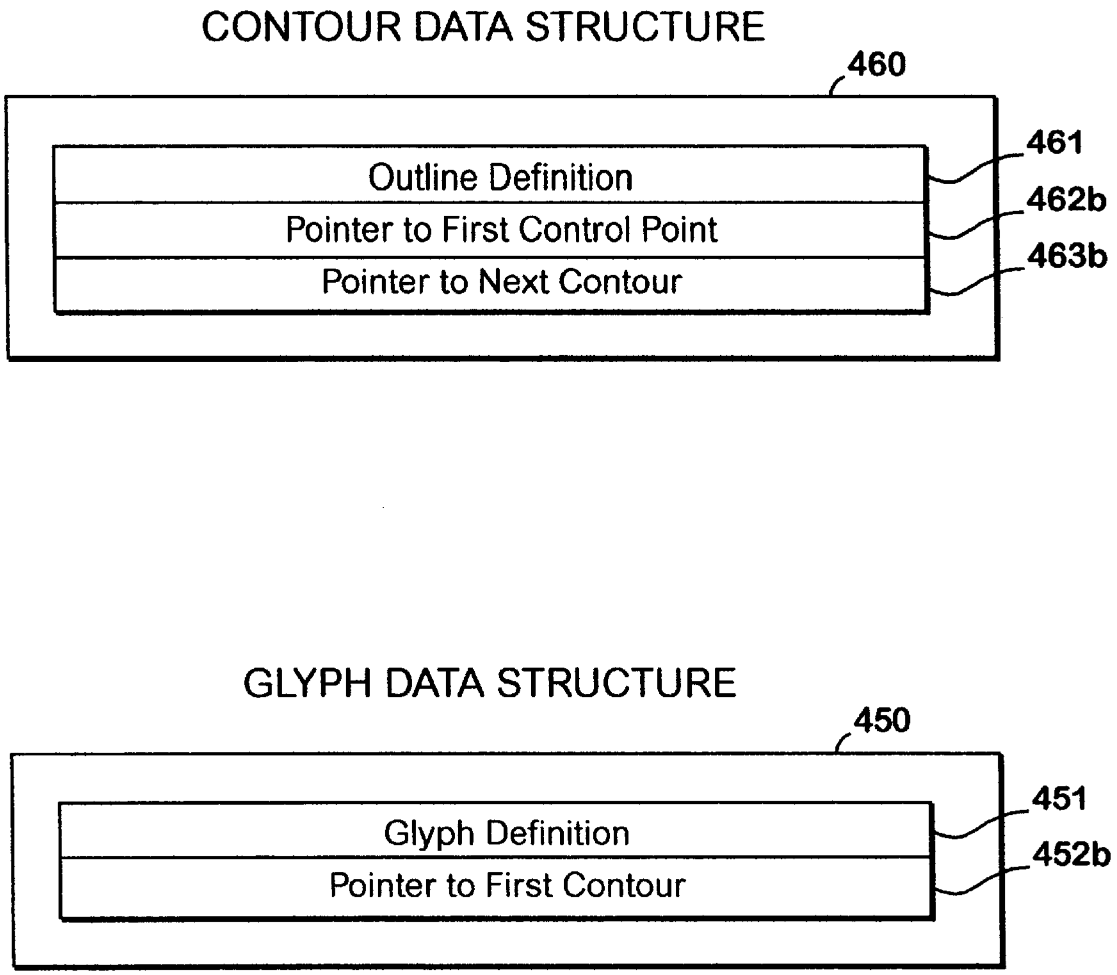
FIGS. 4*b–c* are block diagrams that illustrates an exemplary data structure for storing the graphical font information for a glyph, contour, and control point.

FIGS. **4*b*–*c* illustrate the elements of the conceptual data structure of FIG. 4*a*. A glyph data structure 450 and a contour data structure 460 are shown in FIG. 4*b*. The glyph data structure 450 corresponds to the glyph construct 402 of FIG. 4*a*. The glyph data structure 450 includes a glyph definition data field 451 and a pointer to the first contour 452*b*. The glyph definition data field 451 includes information about the glyph, such as the glyph metrics (left and right side-bearing) or the glyph's bounding box. The pointer to the first contour 452*b* points to the first contour of the glyph. For the glyph 402 shown in FIG. 4*a*, the pointer to the first contour 452*b* corresponds to pointer 452*a***.

Each contour structure 410, 412, 414 shown in FIG. **4*a* corresponds to a separate contour data structure 460. A contour data structure 460 includes an outline definition data field 461, a pointer to the first control point 462*b*, and a pointer to the next contour 463*b*. The outline definition data field 461 includes information defining the contour. The pointer to the first control point 462*b* points to the first control point of the contour. For contour structure 410, the pointer to the first control point 462*b* corresponds to pointer 462*a* of FIG. 4*a*. The pointer to the next contour 463*b* points to the next contour structure in the linked list of contour structures. For contour structure 410, the pointer to the next contour 463*b* corresponds to pointer 463*a* of FIG. 4*a* which points to contour structure 412. If the contour structure is the last contour structure in the linked list, then the pointer to the next contour 463*b* points to the first contour structure in the list. For example, for contour structure 414, the pointer to the next contour 463*b* corresponds to pointer 463*c* of FIG. 4*a* which points to contour structure 410**.

Control Point Data Structure

Figure 4C:
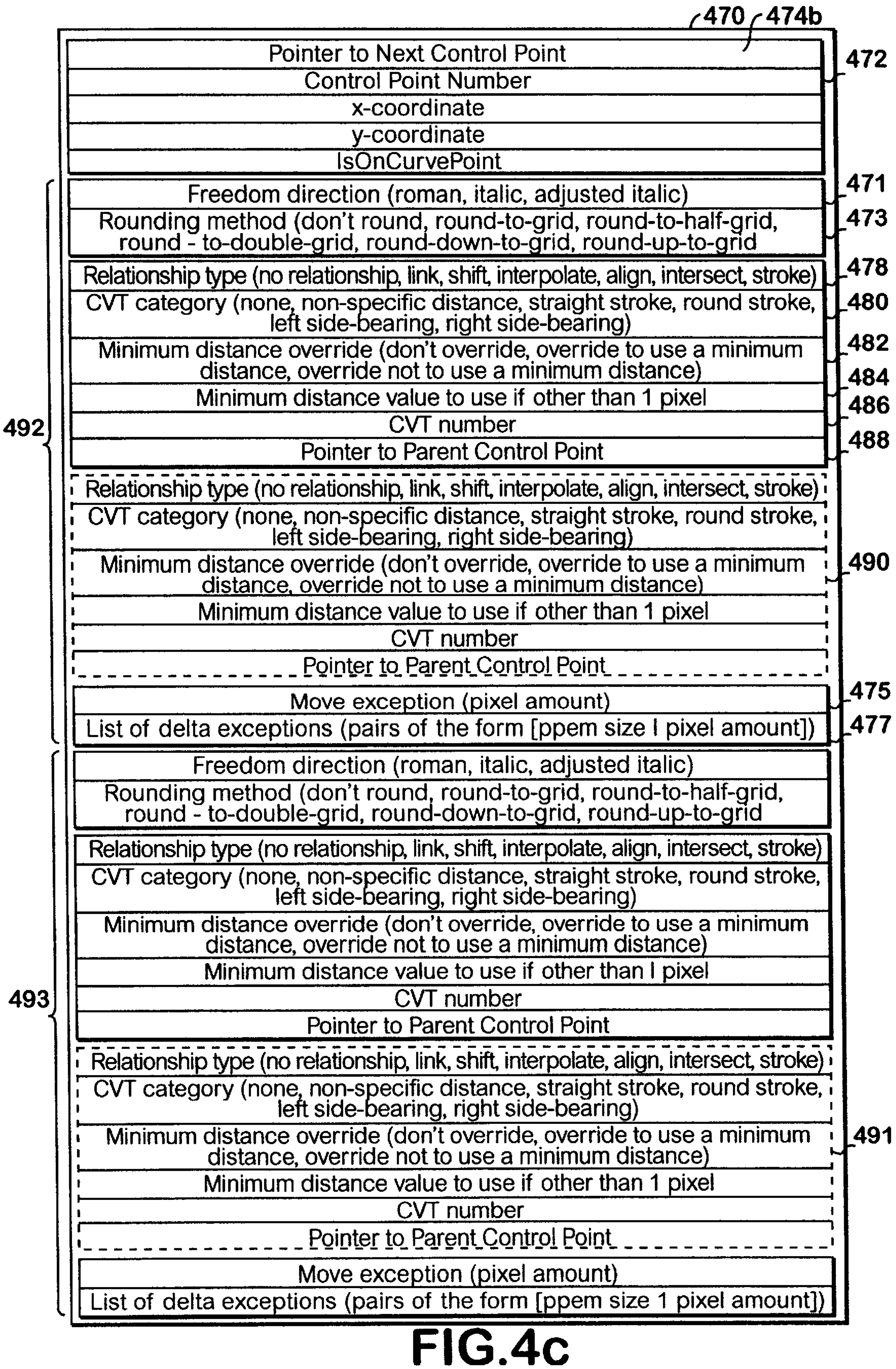

FIG. **4*c* illustrates the data fields of a control point data structure 470. A control point data structure 470 is created for each control point structure 420–435 of FIG. 4***a*. The control point data structure 470 includes data fields for x-direction data 492 and data fields for y-direction data 493. Some of the data fields shown in the control point data structure 470 are optional data fields. The optional data fields are shown in dashed lines. The optional data fields are used if the control point is dependent upon more than one parent control point. The possible values for the data fields of the control point data structure are shown in FIG. 4*d*.

The optional data fields of the control point data structure 470 are grouped into optional sections 490 and 491. If the control point corresponding to the control point data structure 470 is dependent upon more than one parent control point, then one or more of the optional sections are included in the control point data structure 470. For example, if the control point data structure corresponds to a control point that is dependent upon two parent control points in the x-direction, e.g. an interpolated control point, then optional section 490 is included. If the control point data structure corresponds to a control point that is dependent upon four parent control points, e.g. an intersected control point, then optional sections 490 and 491 are included. Additional details on the optional data fields are provided in connection with the descriptions of FIGS. 5*a*–10*b* below.

Control Point Data Fields

The control point data structure includes data fields that define the control point, such as a pointer to the next control point 474*b* and a control point number data field 472. The pointer to the next control point contains a pointer to the next control point on the contour. For control point 20, the pointer to the next control point 474*b* contains a pointer that corresponds to pointer 474*a* of FIG. 4*a* and points to control point 21. The control point number data field contains a value for the control point number. For control point 20, the control point number data field contains a value of 20.

The rounding method data field 473 indicates the rounding method applied to the control point. Typically, a rounding method positions the control point relative to the grid lines in either the x-direction or the y-direction. The use of a rounding method is optional. If a rounding method is not applied to the control point, then the rounding method data field 473 contains a value of 0. If a rounding method is applied, then the rounding method data field 473 contains a non-zero value corresponding to the rounding method. The values for the rounding method data field 473 are shown in FIG. 4*d*. If the control point is fit to the nearest grid line ("round-to-grid"), then the rounding method data field 473 contains a value of 1. If the control point is fit halfway between two grid lines ("round-to-halfgrid"), then the rounding method data field 473 contains a value of 2. If the control point is fit to the nearest grid line or halfway between two grid lines, whichever is closer ("round-to-double-grid point"), then the rounding method data field 473 contains a value of 3. If the control point is fit to the next lower grid line ("round-down-to-grid"), then the rounding method data field 473 contains a value of 4. If the control point is fit to the next higher grid line ("round-up-to-grid"), then the rounding method data field 473 contains a value of 5.

The freedom direction data field 471 indicates the direction the control point can be moved. For example, if the rounding method data field 473 indicates that the round to grid rounding method is applied, then the freedom direction data field 471 indicate the direction the control point is moved. If the freedom direction data field 471 indicates roman (freedom direction data field=0), then the control point can be moved parallel to the grid lines. If the freedom direction data field 471 indicates italic (freedom direction data field=1), then the control point can be moved perpendicular (x-direction) or parallel (y-direction) to the main stroke angle. If the freedom direction data field 471 indicates adjusted italic (freedom direction data field=2), then the control point can be moved perpendicular (x-direction) or parallel (y-direction) to the adjusted italic angle.

The control point data structure 470 also includes data fields for applying a move exception or a delta exception to the control point. A move exception moves the control point a set number of pixels regardless of the ppem size, and a delta exception moves the control point a set number of pixels based on the ppem size. The move exception data field 475 contains the number of pixels the control point should be moved. The list of delta exceptions data field 477 contains a list of delta exception values for the control point. The delta exception values are specified as ppem size/pixel amount.

Relationship Data Fields

The relationship type data field 478 indicates whether the control point is related to one or more parent control points. If the control point is related to a parent control point, then the relationship type data field 478 indicates the type of relationship. FIG. 4*d* shows the possible values for the relationship type data field 478. If the relationship between the control point and the parent control point is a link, then the relationship type data field 478 contains a value of 1. Other relationships, such as a shift, interpolate, align, intersect, or stroke, use different values for the relationship type data field 478 as shown in FIG. 4*d*. If there is a relationship between the parent control point and the control point, then additional information about the relationship is contained in data fields 480–488.

Some of the additional information relates to the control value table ("cvt"). The cvt is a font table that defines values for features of a glyph, such as stem width or serif length. The cvt includes cvt entries. Each cvt entry typically includes a cvt number, a cvt value, and a comment field. An example of a cvt entry is shown below:

287:212(Uppercase Black X Round)

In the example shown above, the cvt number is 287, the cvt value is 212 and the comment field indicates that the cvt entry is applied in the x-direction to uppercase round strokes. The cvt value is specified in font units. Font units are units of measure that are independent of the device grid.

The cvt category data field 480 indicates whether the relationship specifies a stroke or distance that corresponds to the cvt table. If the relationship does not specify a stroke or distance that corresponds to the cvt table, then the cvt category data field 480 contains a value of 0. Otherwise, the cvt category data field 480 contains a non-zero value corresponding to the cvt categories. The values for the cvt category data field 480 are shown in FIG. 4*d*. If the relationship specifies a non-specific distance, then the cvt category data field 480 contains a value of 1. If the relationship specifies a straight stroke, then the cvt category data field 480 contains a value of 2. If the relationship specifies a round stroke, then the cvt category data field 480 contains a value of 3. If the relationship specifies a distance from the left side-bearing point, then the cvt category data field 480 contains a value of 4. If the relationship specifies a distance from the right side-bearing point, then the cvt category data field 480 contains a value of 5.

The relationship can also specify a minimum distance option. The control point data structure includes a minimum distance override data field 482 and a minimum distance value data field 484. These data fields specify the minimum distance option for the parent control point and the control point. The minimum distance override data field 482 specifies whether the default minimum distance option is applied or overridden. The default minimum distance option instructs the rasterizer to maintain a minimum distance between the parent control point and the control point in certain circumstances. To override the default minimum distance option to maintain a minimum distance when the default option would not maintain a minimum distance, the minimum distance override data field 482 contains a value of 1. If the minimum distance override data field 482 contains a value of 1, then the minimum distance value data field 484 indicates the minimum distance in number of pixels. To override the default minimum distance option to ignore a minimum distance when the default option would maintain a minimum distance, the minimum distance override data field 482 contains a value of 2.

Representing Links and an Interpolation Using Control Point Data Structures

FIGS. 5*a*–10*b* illustrate the conceptual data structure and the corresponding control point data structure for various graphical hints. A typographer typically creates graphical hints by dragging and dropping graphical elements that represent hints. The graphical hints are represented by graphical elements displayed on an outline of the glyph. A method for graphically authoring hints is described in the concurrently filed and commonly assigned U.S. patent application Ser. No. 09/049,633, entitled "Method for Authoring Hints for a Font Using a Graphical User Interface," Attorney Docket No. 13237-1990, which is incorporated herein by reference.

Figure 5A:
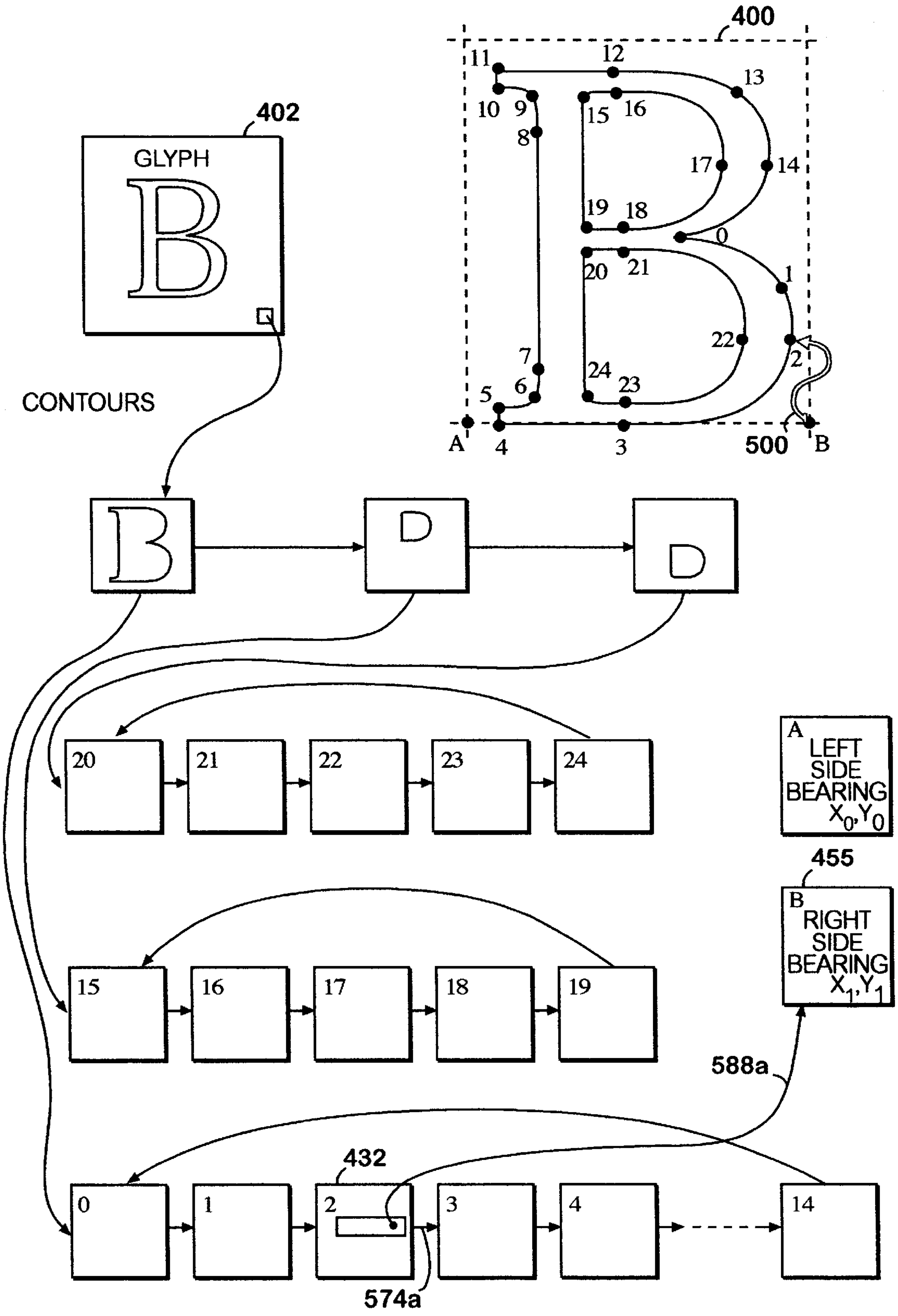
FIG. 5*a* is a diagram illustrating the addition of graphical input for controlling aspects of a displayed font.

FIG. 5*a* illustrates the conceptual data structure for a link 500. A link is a relationship that connects two control points over a flexible distance in either the x-direction or the y-direction. A link begins at a parent control point and ends at a child control point. A link determines the location of the child control point relative to the parent control point. The link 500 is represented on the outline display 400 by an arrow. The arrow has a tail at the right side-bearing point B and an arrowhead at control point 2. The tail of the arrow indicates that the right side-bearing point B is the parent control point of the link. The arrowhead indicates that control point 2 is the child control point of the link. The link is conceptually displayed as a pointer 588*a* from the control structure 432 corresponding to control point 2 to control structure 455 corresponding to the right side-bearing point.

The control point data structure for control point 2 is shown in FIG. 5*b*. For simplicity, only the x-direction data fields are shown in FIG. 5*b*. The control point data structure 570 for control point 2 does not include any of the optional data fields because control point 2 is dependent upon only one parent control point, the right side-bearing point. The pointer to the next control point 574*b* contains a pointer to control point 3. The pointer is conceptually displayed as pointer 574*a* of FIG. 5*a*. The control point number data field contains a value of 2 for control point 2. The pointer to the parent control point 588*b* contains a pointer to the right side-bearing point B. The pointer to the parent control point is conceptually displayed as pointer 588*a* of FIG. 5*a*.

The data fields of the control point data structure 570 can be used to generate a Type Man Talk command, specifically an XLink command. The basic syntax for an XLink command is XLink(point1, point2, [cvt1]), where point1 is the parent control point, point2 is the child control point, and cvt1 is the optional cvt value. The contents of the relationship type data field 578 indicate that the relationship is a link in the x-direction. The contents of the pointer to parent control point 588*b* indicate that the parent control point for the link is the right side-bearing point. The contents of the control point number data field 572 indicate that the child control point for the link is control point 2. The cvt category data field 580 indicates that the link is related to the right side-bearing point. If a cvt number is not specified in the control point data structure 570, then typically, the compiler chooses a cvt value based upon the contents of the cvt category data field 580. In this example, the cvt value selected by the compiler is "right side-bearing cvt." Therefore, the Type Man Talk command corresponding to the control point data structure 570 is XLink(B, 2, right side-bearing cvt).

Figure 6A:
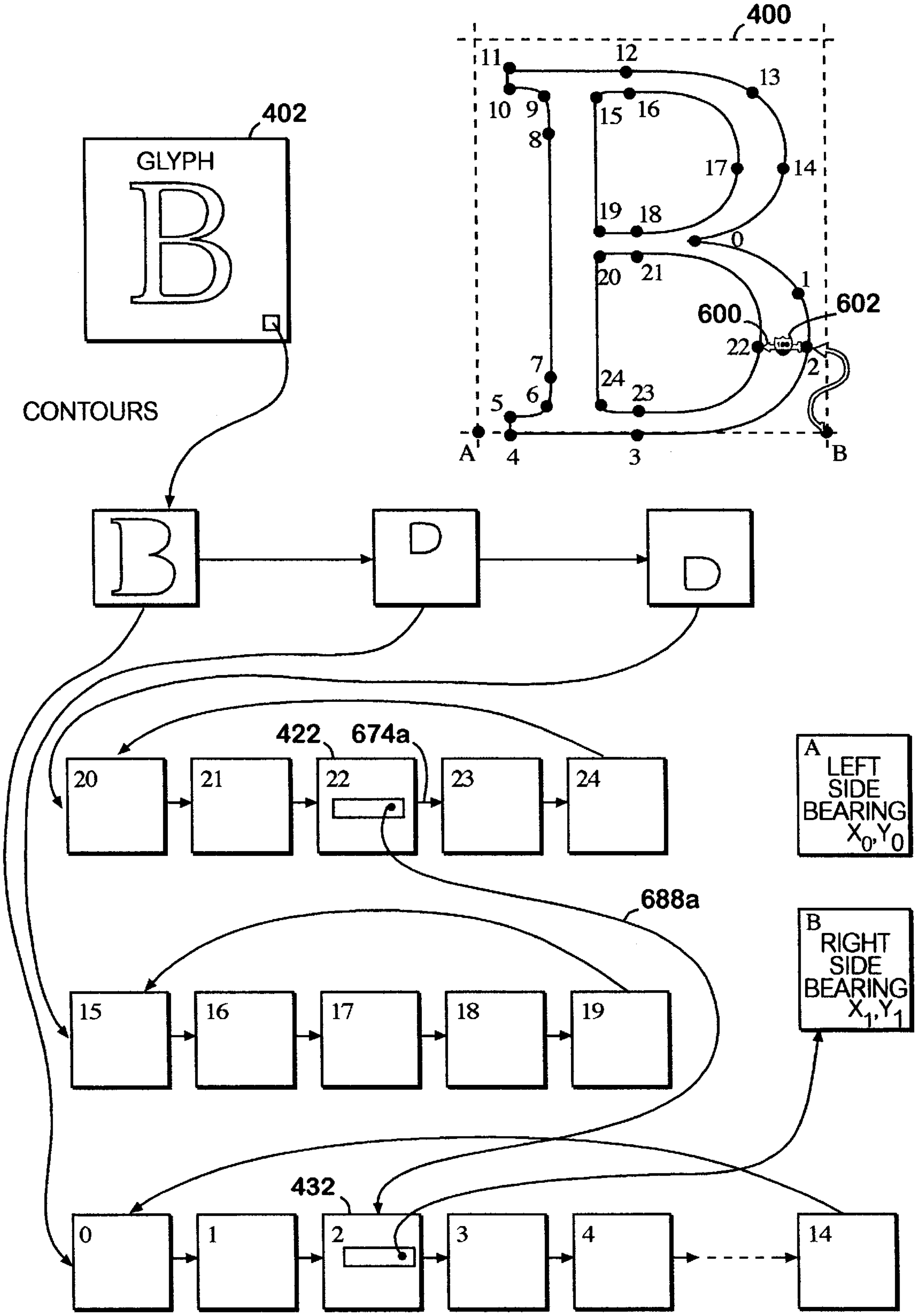
FIG. 6*a* is a diagram illustrating the addition of graphical input for controlling aspects of a displayed font.

FIG. 6*a* illustrates the conceptual data structure for another link 600. The link 600 is represented on the outline display 400 by an arrow. The arrow has a tail at control point 2 and an arrowhead at control point 22. The tail of the arrow indicates that control point 2 is the parent control point of the link. The arrowhead indicates that control point 22 is the child control point of the link. The arrowhead is rounded indicating that the link corresponds to a round stroke. The arrow includes a highway sign 602 which indicates that the link 600 is associated with a cvt entry. The link is conceptually displayed as a pointer 688*a* from the control structure 422 corresponding to control point 22 to the control structure 432 corresponding the control point 2.

The control point data structure for control point 22 is shown in FIG. 6*b*. For simplicity, only the x-direction data fields are shown in FIG. 6*b*. The control point data structure 670 for control point 22 does not include any of the optional data fields because control point 22 is dependent upon only one parent control point, control point 2. The pointer to the next control point 674*b* contains a pointer to control point 23. The pointer to the next control point is conceptually displayed as pointer 674*a* of FIG. 6*a*. The control point number data field contains a value of 22 for control point 22. The pointer to the parent control point 688*b* contains a pointer to control point 2. The pointer to the parent control point is conceptually displayed as pointer 688*a* of FIG. 6*a*.

The data fields of the control point data structure 670 can be used to generate an XLink command. The contents of the relationship type data field 678 indicate that the relationship is a link in the x-direction. The contents of the pointer to parent control point 688*b* indicate that the parent control point for the link is control point 2. The contents of the control point number data field 672 indicate that the child control point for the link is control point 22. The cvt category data field 680 indicates that the link is related to a round stroke. The cvt number data field indicates that the link corresponds to the cvt value of cvt number 100. Therefore, the Type Man Talk command corresponding to the control point data structure 670 is XLink(2, 22, 100).

Figure 7A:
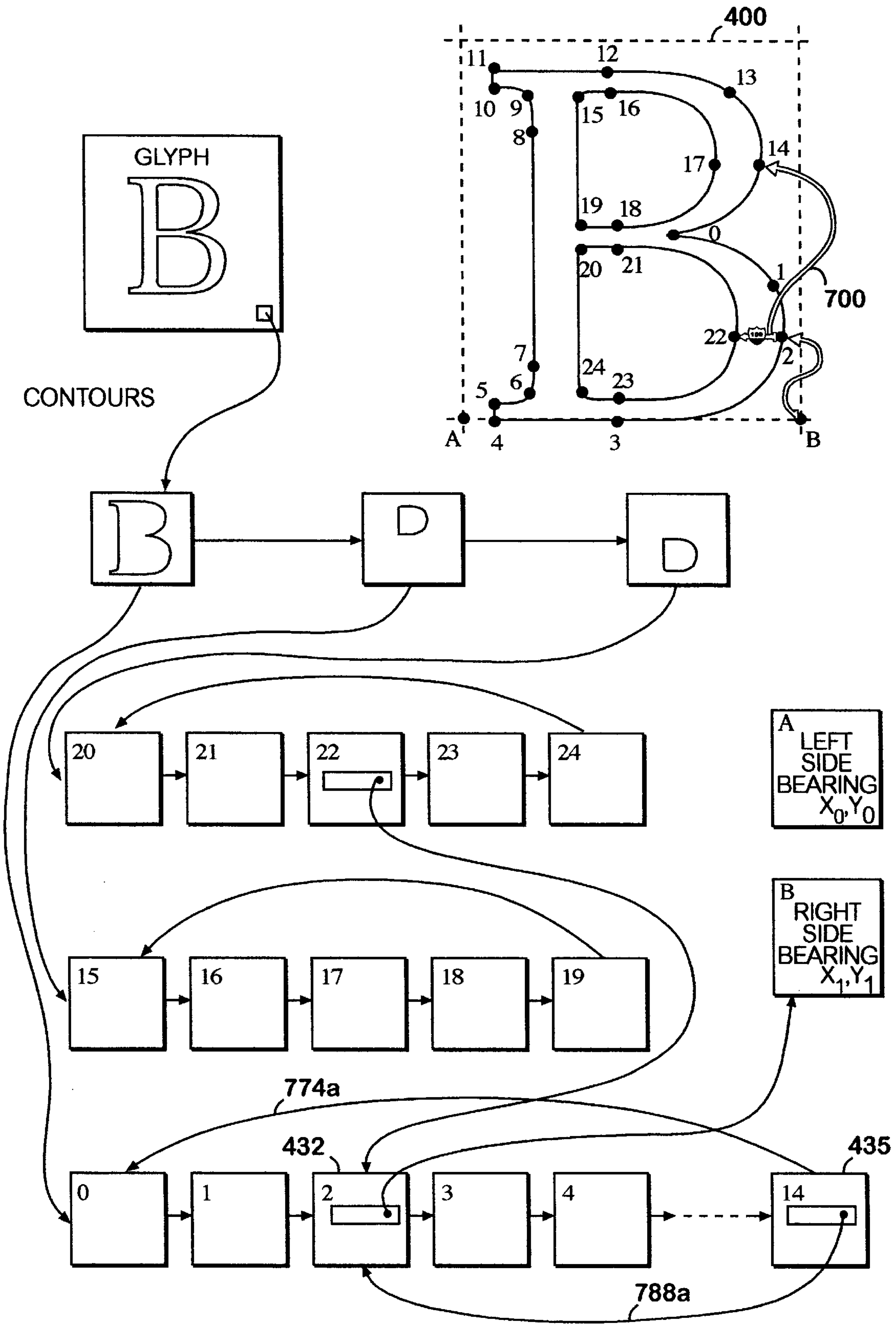
FIG. 7*a* is a diagram illustrating the addition of graphical input for controlling aspects of a displayed font.

FIG. 7*a* illustrates the conceptual data structure for yet another link 700. The link 700 is represented on the outline display 400 by an arrow. The arrow has a tail at control point 2 and an arrowhead at control point 14. The tail of the arrow indicates that control point 2 is the parent control point of the link. The arrowhead indicates that control point 14 is the child control point of the link. The link is conceptually displayed as a pointer 788*a* from the control structure 435 corresponding to control point 14 to the control structure 432 corresponding to control point 2.

The control point data structure for control point 14 is shown in FIG. 7*b*. For simplicity only the x-direction data fields are shown in FIG. 7*b*. The control point data structure 770 for control point 14 does not include any of the optional data fields because control point 14 is dependent upon only one parent control point, control point 2. The pointer to the next control point 774*b* contains a pointer to control point 0. Control point 14 is the last control point on the contour. Therefore, the pointer to the next control point 774*b* points to the first control point on the contour, control point 0. The pointer to the next control point is conceptually displayed as pointer 774*a* of FIG. 7*a*. The control point number data field contains a value of 14 for control point 14. The pointer to the parent control point 788*b* contains a pointer to control point 2. The pointer to the parent control point is conceptually displayed as pointer 788*a* of FIG. 7*a*.

The data fields of the control point data structure 770 can be used to generate an XLink command. The contents of the relationship type data field 778 indicate that the relationship is a link in the x-direction. The contents of the pointer to parent control point 788*b* indicate that the parent control point for the link is control point 2. The contents of the control point number data field 772 indicate that the child control point for the link is control point 14. The cvt category data field 780 indicates that the link is related to a non-specific distance. Because a cvt number is not specified in the control point data structure 770, the compiler chooses a cvt value based upon the contents of the cvt category data field 780. In this example, the cvt value selected by the compiler is "non-specific distance cvt." Therefore, the Type Man Talk command corresponding to the control point data structure 770 is XLink(2, 14, non-specific distance cvt).

Figure 8A:
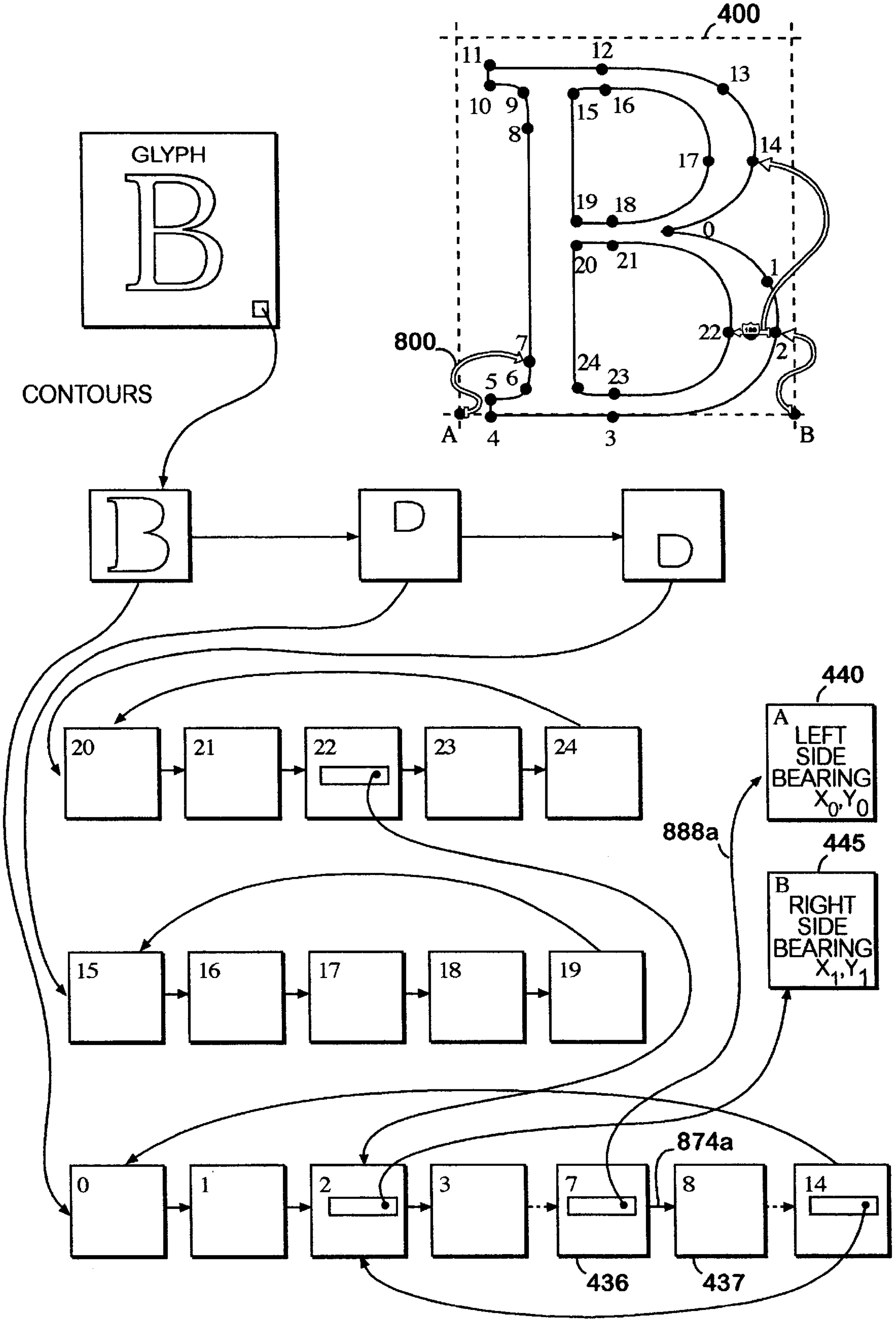
FIG. 8*a* is a diagram illustrating the addition of graphical input for controlling aspects of a displayed font.

FIG. 8*a* illustrates the conceptual data structure for a link from the left side bearing point 800. The link is represented on the outline display 400 by an arrow. The arrow has a tail at the left side-bearing point A and an arrowhead at control point 7. The tail of the arrow indicates that the left side-bearing point A is the parent control point of the link. The arrowhead indicates that control point 7 is the child control point of the link. The link is conceptually displayed as a pointer 888*a* from the control structure 436 corresponding to control point 7 to the control structure 440 corresponding to the left side-bearing point.

The control point data structure for control point 7 is shown in FIG. 8*b*. For simplicity only the x-direction data fields are shown in FIG. 8*b*. The control point data structure 870 for control point 7 does not include any of the optional data fields because control. point 7 is dependent upon only one parent control point, the left side-bearing point. The pointer to the next control point 874*b* contains a pointer to control point 8. The pointer to the next control point is conceptually displayed as pointer 874*a* of FIG. 8*a*. The control point number data field contains a value of 7 for control point 7. The pointer to the parent control point 888*b* contains a pointer to the left side-bearing point A. The pointer to the parent control point is conceptually displayed as pointer 888*a* of FIG. 8*a*.

The data fields of the control point data structure 870 can be used to generate an XLink command. The contents of the relationship type data field 878 indicate that the relationship is a link in the x-direction. The contents of the pointer to parent control point 888*b* indicate that the parent control point for the link is the left side-bearing point. The contents of the control point number data field 872 indicate that the child control point for the link is control point 7. The cvt category data field 880 indicates that the link is related to the left side-bearing point. Because a cvt number is not specified in the control point data structure 870, the compiler chooses a cvt value based upon the contents of the cvt category data field 880. In this example, the cvt value selected by the compiler is "left side-bearing cvt." Therefore, the Type Man Talk command corresponding to the control point data structure 870 is XLink(A, 7, left side-bearing cvt).

Figure 9A:
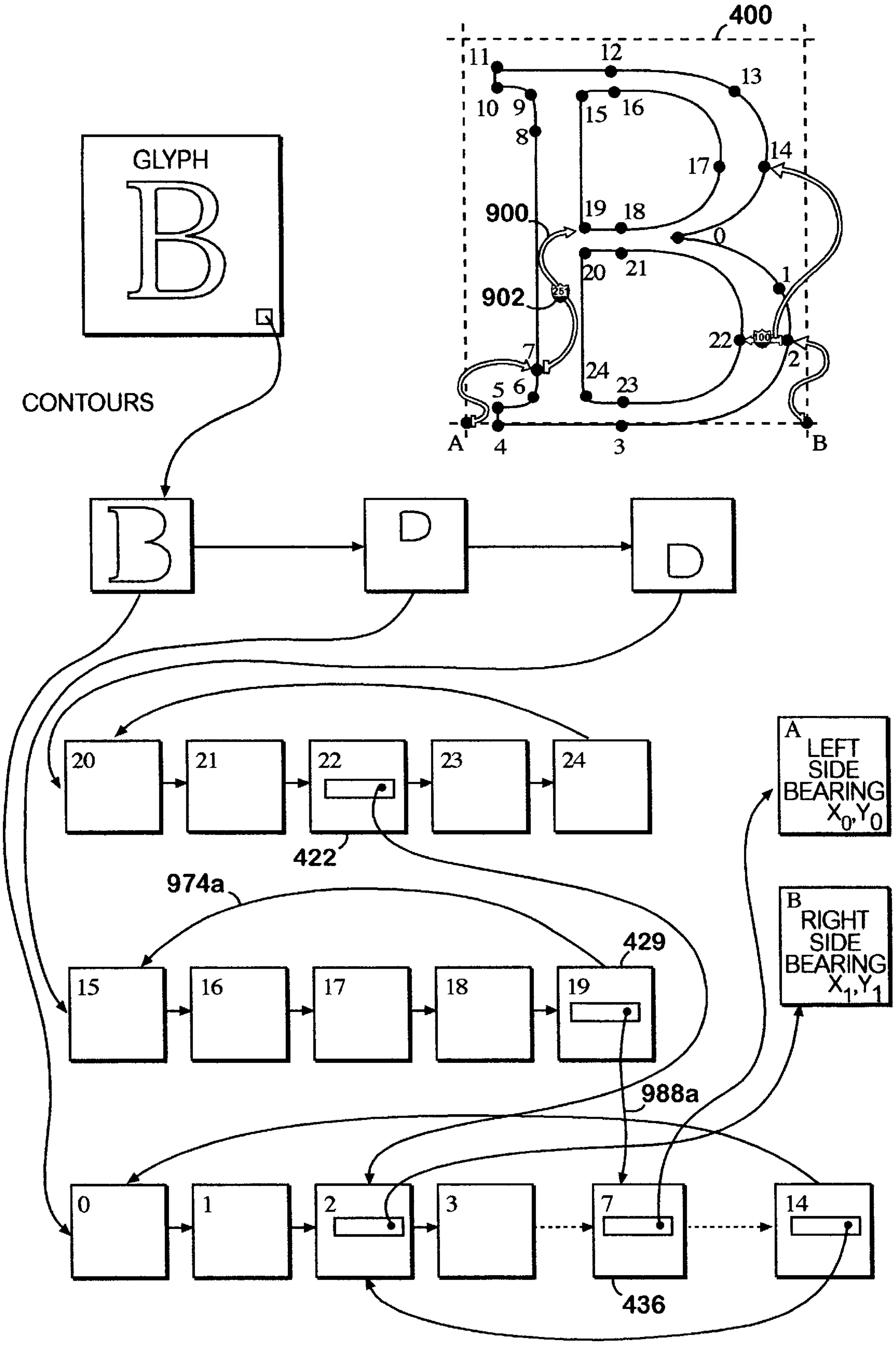
FIG. 9*a* is a diagram illustrating the addition of graphical input for controlling aspects of a displayed font.

FIG. 9*a* illustrates the conceptual data structure for another link 900. The link 900 is represented on the outline display 400 by an arrow. The arrow has a tail at control point 7 and an arrowhead at control point 19. The tail of the arrow indicates that control point 7 is the parent control point of the link. The arrowhead indicates that control point 19 is the child control point of the link. The arrowhead is blunt indicating that the link corresponds to a straight stroke. The arrow includes a highway sign 902 which indicates that the link 900 is associated with a cvt entry. The link is conceptually displayed as a pointer 988*a* from the control structure 429 corresponding to control point 19 to the control structure 436 corresponding to control point 7.

The control point data structure for control point 19 is shown in FIG. 9*b*. For simplicity, only the x-direction data fields are shown in FIG. 9*b*. The control point data structure 970 for control point 19 does not include the optional data fields because control point 19 is dependent upon only one parent control point, control point 7. The pointer to the next control point 974*b* contains a pointer to control point 15. Control point 19 is the last control point on the contour. Therefore, the pointer to the next control point 974*b* points to the first control point on the contour, control point 15. The pointer to the next control point is conceptually displayed as pointer 974*a* of FIG. 9*a*. The control point number data field contains a value of 19 for control point 19. The pointer to the parent control point 988*b* contains a pointer to control point 7. The pointer to the parent control point is conceptually displayed as pointer 988*a* of FIG. 9*a*.

The data fields of the control point data structure 970 can be used to generate an XLink command. The contents of the relationship type data field 978 indicate that the relationship is a link in the x-direction. The contents of the pointer to parent control point 988*b* indicate that the parent control point for the link is control point 7. The contents of the control point number data field 972 indicate that the child control point for the link is control point 19. The cvt category data field 980 indicates that the link is related to a straight stroke. The cvt number data field indicates that the link corresponds to the cvt value of cvt number 251. Therefore, the Type Man Talk command corresponding to the control point data structure 970 is XLink(7, 19, 251).

Figure 10A:
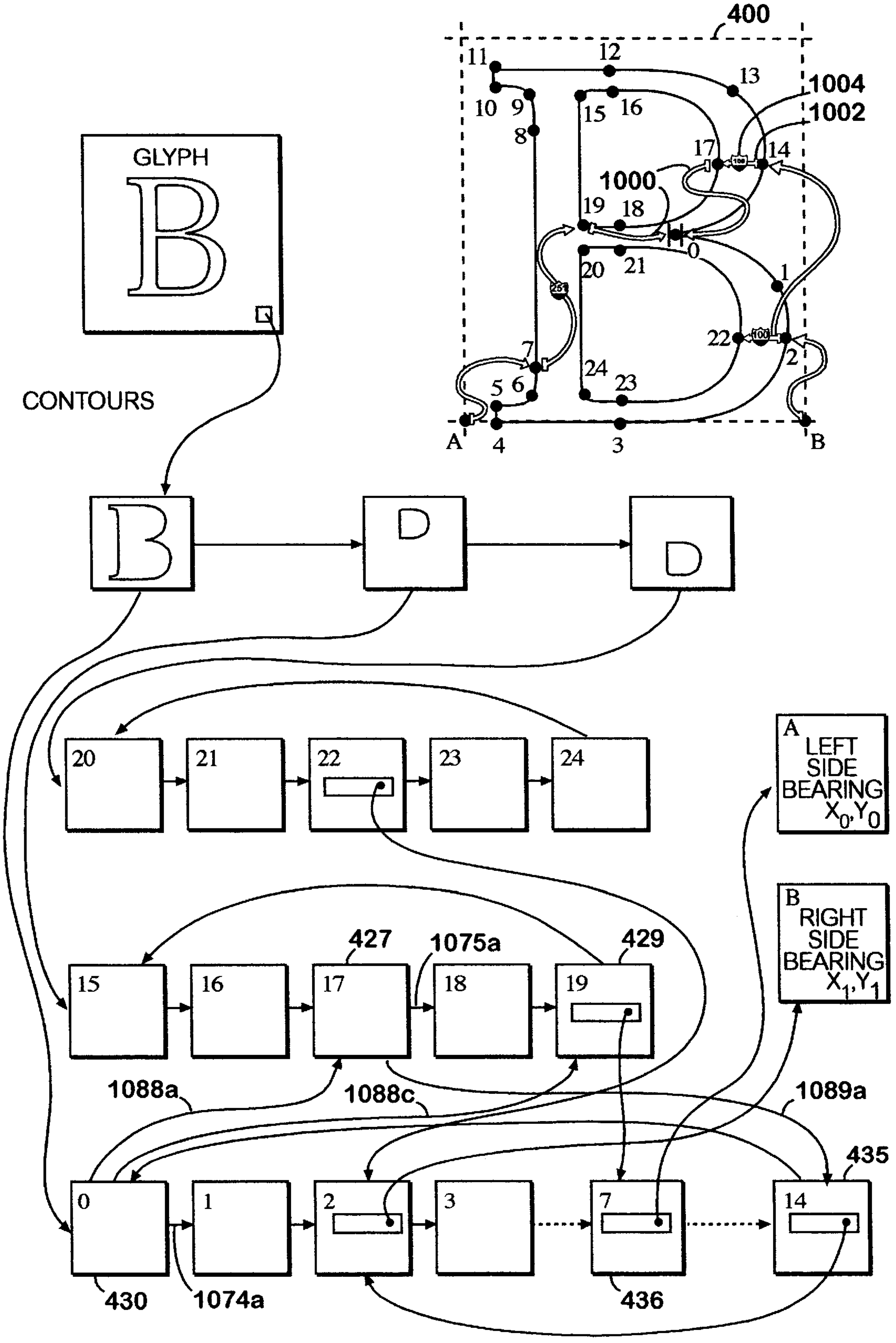
FIG. 10*a* is a diagram illustrating the addition of graphical input for controlling aspects of a displayed font.

FIG. 10*a* illustrates the conceptual data structure for an interpolation 1000 and a link 1002. An interpolation maintains the relative position of one or more child points that fall between two parent control points. The relative position is maintained in either the x-direction or the y-direction. The interpolation is represented on the outline display 400 by a pair of arrows. Each arrow has a tail at the parent control point and an arrowhead at the child control point. One arrow has a tail at control point 17 and an arrowhead at control point 0. The other arrow has a tail at control point 19 and an arrowhead at control point 0. The interpolation is conceptually displayed as a pair of pointers 1088*a* and 1088*c* from the control structure 430 corresponding to control point 0. One pointer points to the control structure 427 corresponding to control point 17 and the other pointer points to the control structure 429 corresponding to control point 19.

The control point data structure 1070 for control point 0 is shown in FIG. 10*b*. For simplicity, only the x-direction data fields are shown in FIG. 10*b*. The control point data structure 1070 for control point 0 includes an optional section (data fields 1078'–1086' and 1088*d*) because control point 0 is dependent upon two parent control points, control point 17 and control point 19. The pointer to the next control point data field 1074*b* contains a pointer to control point 1. The pointer to the next control point is conceptually displayed as pointer 1074*a* of FIG. 10*a*. The control point number data field contains a value of 0 for control point 0. The pointer to the first parent control point 1088*b* contains a pointer to the control point 17. The pointer to the first parent control point is conceptually displayed as pointer 1088*a* of FIG. 10*a*. The pointer to the second parent control point 1088*d* contains a pointer to control point 19. The pointer to the second parent control point is conceptually displayed as pointer 1088*c* of FIG. 10*a*.

The data fields of the control point data structure 1070 can be used to generate a Type Man Talk command, specifically an XInterpolate command. The basic syntax for an XInterpolate command is XInterpolate(parentA, child1, . . ., parentB), where parentA is the first parent control point, child 1 is the child control point, and parentB is the second parent control point. If there is more than one child control point, then the additional child control points are inserted after child1. The contents of the relationship type data fields 1078 and 1078' indicate that the relationship is an interpolation in the x-direction. The contents of the pointers to the parent control points 1088*b* and 1088*d* indicate that the parent control points are control point 17 and control point 19. The contents of the control point number data field 1072 indicate that the child control point for the interpolation is control point 0. Therefore, the XInterpolate command corresponding to the control point data structure 1070 is XIPAnchor(17, 0, 19).

The link 1002 shown in FIG. 10*a* is represented on the outline display 400 by an arrow. The arrow has a tail at control point 14 and an arrowhead at control point 17. The tail of the arrow indicates that control point 14 is the parent control point of the link. The arrowhead indicates that control point 17 is the child control point of the link. The arrowhead is rounded indicating that the link corresponds to a round stroke. The arrow includes a highway sign 1004 which indicates that the link 1002 is associated with a cvt entry. The link is conceptually displayed as a pointer 1089*a* from the control structure 427 corresponding to control point 17 to the control structure 435 corresponding to control point 14.

The control point data structure 1071 for control point 17 is shown in FIG. 10*b*. For simplicity, only the x-direction data fields are shown in FIG. 10*b*. The control point data structure for control point 17 does not include the optional data fields because control point 17 is dependent upon only one parent control point, control point 14. The pointer to the next control point 1075*b* contains a pointer to control point 18. The pointer to the next control point is conceptually displayed as pointer 1075*a* of FIG. 10*a*. The control point number data field contains a value of 17 for control point 17. The pointer to the parent control point 1089*b* contains a pointer to control point 14. The pointer to the parent control point is conceptually displayed as pointer 1089*a* of FIG. 10*a*.

The data fields of the control point data structure 1071 can be used to generate an XLink command. The contents of the relationship type data field 1079 indicate that the relationship is a link in the x-direction. The contents of the pointer to parent control point 1089*b* indicate that the parent control point for the link is control point 14. The contents of the control point number data field 1073 indicate that the child control point for the link is control point 17. The cvt category data field 1081 indicates that the link is related to a round stroke. The cvt number data field indicates that the link corresponds to the cvt value of cvt number 100. Therefore, the Type Man Talk command corresponding to the control point data structure 970 is XLink(14, 17, 100).

Converting Control Point Data Structures to Hinting Commands and Converting Hinting Commands to Control Point Data Structures In addition, to the links and the interpolation illustrated by FIGS. 5*a*–10*b*, the control point data structure can be used to represent other types of graphical hints. FIGS. 11, 12, and 13 illustrate the contents of control point data structures that represent other types of graphical hints. Typically, the control point data structure corresponding to the child control point contains the information for the hint. As discussed above in more detail in connection with FIGS. 5*a*–10*b*, hints can be represented by graphical elements displayed on a glyph outline. The graphical elements are converted into one or more control point data structures which are then converted into hinting commands. FIGS. 11, 12, and 13 also illustrate the conversion of a Type Man Talk command into a control point data structure. Once the Type Man Talk command is converted into a control point data structure, then the hint can be graphically displayed to the typographer.

FIG. 11 illustrates the contents of a control point data structure for a control point having a single dependency. A control point has a single dependency if the control point is dependent upon only one parent control point. In FIG. 11, the control point is represented by "CP" and the parent control point is represented by "PP1". Hints that define a single dependency include links, distances, and shifts.

Once the control point data structure is created, the contents of the control point data structure can be used to generate a hinting command, such as a Type Man Talk command. To convert a control point data structure that has a single dependency into a Type Man Talk command, the contents of the freedom direction data field, the rounding method data field, the relationship type data field, the cvt category data field, the minimum distance override data field, the minimum distance value data field, the cvt number data field, and the pointer to the parent control point are examined. The contents of these data fields determine the type of Type Man Talk command and the parameters for the Type Man Talk command. FIG. 11 illustrates the conversion of the control point data fields for the x-direction data. The conversion of the control point data fields for the y-direction data is similar.

If the typographer enters a graphical hint corresponding to a link using a round-to-half-grid rounding method, then a control point data structure containing the following values is created: freedom direction data field=0, rounding method data field=2, relationship type data field=1, cvt category data field=1, minimum distance override data field=0, minimum distance value data field=1, cvt number data field=cvt, and pointer to the parent control point=PP1. The contents of the control point data structure are examined, and then the control point data structure is converted to a link command, XLink(PP1, CP, cvt), and a rounding command, XHalfGrid (CP). If the typographer changes the rounding method to round-to-double-grid, then the rounding method data field is changed to 3. As a result, the XHalfGrid(CP) command is deleted and a new rounding command is created, XDoubleGrid(CP).

A Type Man Talk shift command can be converted into a control point data structure. If the shift command is XShift (PP1, CP), then a control point data structure containing the following values is created: freedom direction data field=0, rounding method data field=0, relationship type data field=2; and pointer to the parent control point=PP1. Once the control point data structure is created, the control point data structure can be used to graphically display the shift.

FIG. 12 illustrates the contents of a control point data structure for a control point having a double dependency. A control point has a double dependency if the control point is dependent upon two parent control points. In FIG. 12, the control point is represented by "CP", the first parent control point is represented by "PP1", and the second parent control point is represented by "PP2". Hints that define a double dependency include interpolations and alignments.

To convert a control point data structure that has a double dependency into a Type Man Talk command, the contents of the freedom direction data field, the rounding method data field, the relationship type data field, and the pointers to the parent control points are examined. The contents of these data fields determine the type of Type Man Talk command and the parameters for the Type Man Talk command. FIG. 12 illustrates the conversion of the control point data fields for the x-direction data. The conversion of the control point data fields for the y-direction data is similar.

If the typographer enters a graphical hint corresponding to an interpolation, then a control point data structure containing the following values is created: freedom direction data field=0, rounding method data field=0, relationship type data field=3, pointer to first parent control point=PP1, and pointer to second parent control point=PP2. The contents of the control point data structure are examined, and then the control point data structure is converted to an interpolate command, XInterpolate(PP1, CP, PP2).

A Type Man Talk alignment command can be converted into a control point data structure. If the alignment command is Align(PP1, CP, PP2), then a control point data structure containing the following values is created: freedom direction data field=0, rounding method data field=0, relationship type data field=4, pointer to the first parent control point=PP1, and pointer to the second parent control point=PP2. Once the control point data structure is created, the control point data structure can be used to graphically display the alignment.

FIG. 13 illustrates the contents of a control point data structure for a control point having a quadruple dependency. A control point has a quadruple dependency if the control point is dependent upon four parent control points. In FIG. 13, the control point is represented by "CP", the first parent control point is represented by "PP1", the second parent control point is represented by "PP2", the third parent control point is represented by "PP3", and the fourth parent control point is represented by "PP4". Hints that define a quadruple dependency include an intersection.

To convert a control point data structure that has a quadruple dependency into a Type Man Talk command, the contents of the relationship type data field and the pointers to the parent control points are examined. The contents of these data fields determine the type of Type Man Talk command and the parameters for the Type Man Talk command.

If the typographer enters a graphical hint corresponding to an intersection, then a control point data structure containing the following values is created: relationship type data field=5, pointer to first parent control point=PP1, pointer to second parent control point=PP2, pointer to third parent control point=PP3, and pointer to fourth parent control point=PP4. The contents of the control point data structure are examined, and then the control point data structure is converted to an intersection command, Intersect(CP, PP1, PP2, PP3, PP4).

Conversely, a Type Man Talk intersection command can be converted into a control point data structure. If the intersection command is Intersect(CP, PP1, PP2, PP3, PP4), then a control point data structure containing the following values is created: relationship type data field=5, pointer to first parent control point=PP1, pointer to second parent control point=PP2, pointer to third parent control point=PP3, and pointer to fourth parent control point=PP4. Once the control point data structure is created, the control point data structure can be used to graphically display the intersection.

Figure 14:
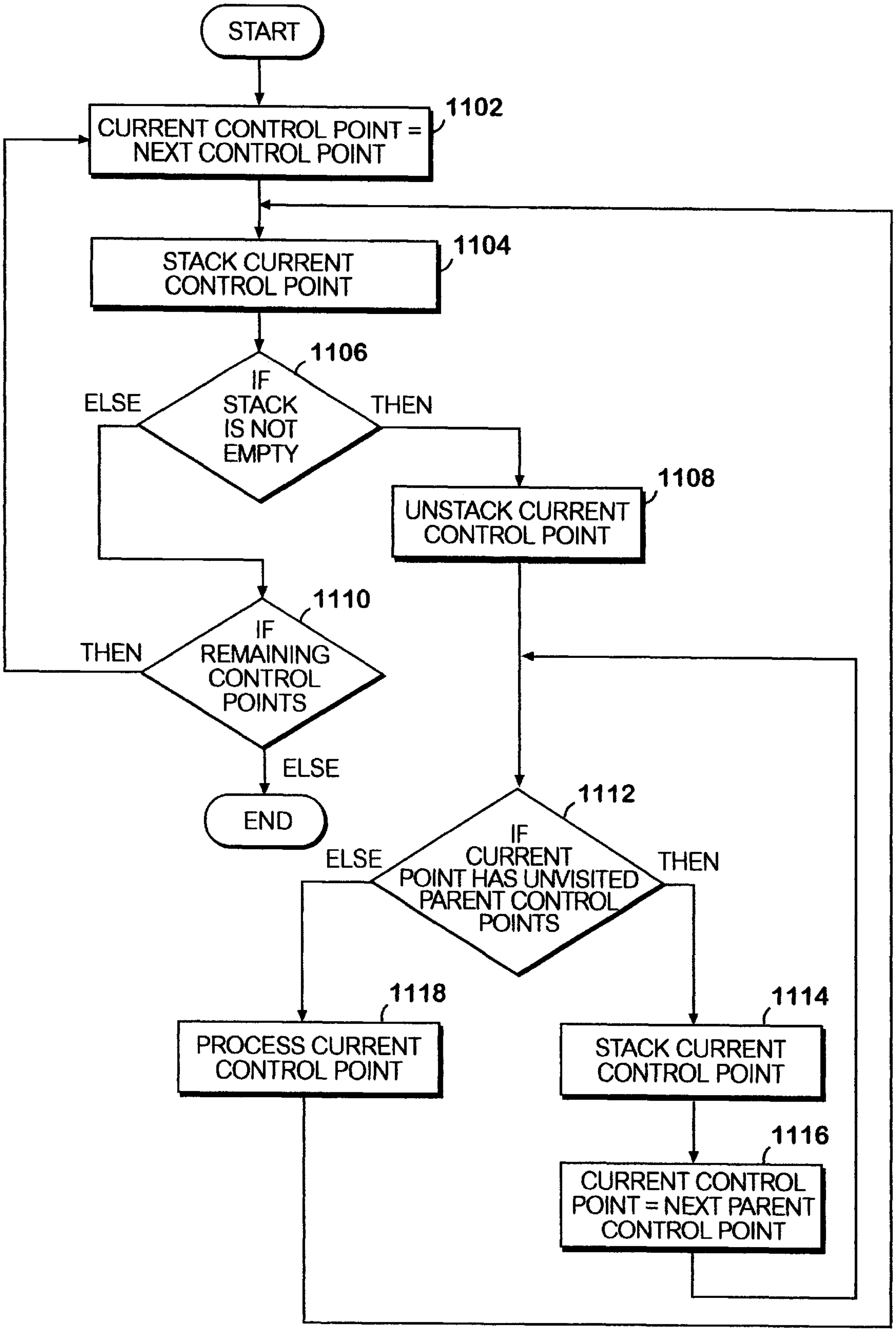
FIG. 14 is a flow diagram illustrating an exemplary process for traversing an exemplary data structure during the compilation of the data structure to generate font instructions.

FIG. 14 is a flow diagram of the operation of translating the data within the data structure into hinting instructions. This process is simply a depth search algorithm that forces each of the parents of a control point to be visited and processed prior to processing the control point. As described above in the discussion of FIGS. 4*a*–4*c*, the data structure defines a selection order for each of the control points of a glyph. At step 1102, a Current Control Point variable is equated to the Next Control Point as defined in the data structure. At the first instance of this algorithm, the Next Control Point is the first control point in the data structure. At step 1104, the Current Control Point is placed on a stack for temporary storage. At step 1106, the status of the stack is determined. If the stack is not empty, processing continues at step 1108. If the stack is empty, processing continues at step 1110.

At step 1108, the last control point to be placed on the stack is removed and the Current Control Point is equated to this control point. At step 1112, if the Current Control Point has unvisited parent control points, processing continues at step 1114. If the Current Control Point does not have unvisited parent control points, processing continues at step 1118.

At step 1114, the Current Control Point is placed on the stack. At step 1116, the Current Control Point is equated to the Next Parent Control Point as defined by the data structure. Processing then returns to step 1106.

Step 1118 is reached from step 1112 when the Current Control Point does not have any unvisited parent control points. In this situation, the Current Control Point is processed. Generally, this process includes identifying the hinting function associated with the control point and any parent control point, and generating hinting instructions in accordance with the hinting function.

Step 1110 is reached from step 1106 when the stack has been emptied. At this point, processing returns to step 1102 if any control points in the data structure have not been visited. Once each of the control points have been visited, processing ends at step 1120.

Conclusion

The present invention provides a method for creating high-level language hinting instructions through the use of a graphical user interface. The present invention enables a user to generate complex font programs without requiring knowledge or experience in font programming. Graphical commands are entered by a user while editing a glyph. The graphical commands are converted into functional data and stored within a data structure that represents the edited glyph. The functional data is then compiled or translated into high-level language hinting instructions that can later be compiled to machine code. Specifically, this aspect of the present invention relieves the user of having to specify the order of the hinting instructions. The present invention also provides a method to translate high-level language hinting instructions into functional data. The functional data can then be used to update the display of the edited glyph. This aspect of the present invention allows experienced font programmers to modify a font program but still maintain the ability to graphically edit the font program.

The present invention may be conveniently implemented in one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of the application.

Alternative embodiments will become apparent to those skilled in the art to which the present invention pertains without departing from its spirit and scope. Accordingly, the scope of the present invention is described by the appended claims and supported by the foregoing description.

I claim:

1. A system for generating hinting commands that can be compiled to create font data files, comprising:

a processing unit;

a memory storage device;

a data interface for receiving user commands;

a display device for displaying graphical representations of various hinting commands;

a data structure, stored in the memory storage device for organizing data representing a glyph and various hinting commands;

a program module, stored in the memory storage device for providing instructions to the processing unit;

the processing unit, responsive to the instructions of the program module, being operative to:

receive a graphical command over the data interface, the graphical command representing a certain hinting function based on a selected control point and at least one parent control point;

display on the display device, a graphical representation of the certain hinting function;

translate the graphical command into functional data representing the certain hinting function;

store the functional data in the data structure; and generate a hinting command set as a function of the functional data, the selected control point, and each parent control point.

2. The system of claim 1, wherein the processing unit is further operative to:

store the hinting command set into a program file;

receive an editing command over the data interface, the editing command representing a change to the contents of the program file;

modify the contents of the program file in accordance with the editing command;

adjust the contents of the data structure in accordance with the contents of the program file;

display on the display device, a graphical representation for each hinting function represented by the contents of the data structure.

3. The system of claim 1, wherein the graphical command identifies one control point and the step of generating a hinting command set comprises generating an anchor hinting command.

4. The system of claim 1, wherein the graphical command identifies two control points and the step of generating a hinting command set comprises generating a single-dependency hinting command.

5. The system of claim 1, wherein the graphical command identifies three control points and the step of generating a hinting command set comprises generating a double-dependency hinting command.

6. The system of claim 1, wherein the graphical command identifies five control points and the step of generating a hinting command set comprises generating a quad-dependency hinting command.

7. A method for rendering a glyph on an output device using a hinting command set created by translating functional data into the hinting command set, the functional data being stored in a data structure and representing a hinting function for the glyph, the glyph including a plurality of control points, the method comprising the steps of:

(a) selecting a control point from the plurality of control points of the glyph;

(b) identifying within the data structure, functional data representing a hinting function that is associated with the selected control point and at least one parent control point associated with the control point of the glyph;

(c) generating the hinting command set as a function of at least the functional data, the selected control point, and each parent control point;

(d) using the hinting command set to render the glyph on the output device.

8. The method of claim 7, wherein the glyph includes at least one contour with each contour of the glyph having an associated contour data field group within the data structure, each of the plurality of control points of the glyph is associated with only one contour and has an associated control point data field group within the data structure, and the step of selecting a control point comprises the steps of:

selecting a contour of the glyph;

examining the contour data field group associated with the selected contour to identify a control point associated with the selected contour; and choosing the identified control point as the selected control point.

9. The method of claim 8, wherein the step of identifying functional data comprises the step of extracting data from the control point data field group associated with the selected control point as the identified functional data.

10. The method of claim 8, wherein each control point data field group includes a freedom direction data field, a rounding method data field, and a relationship type data field, and the step of identifying functional data comprises the steps of:

examining the control point data field group associated with the selected control point to determine the number of parent control points associated with the hinting function; and in response to determining that no parent control points are associated with the hinting function, extracting data from the freedom direction data field, the rounding method data field, and the relationship type data field as the identified functional data.

11. The method of claim 10 wherein the step of generating the hinting command set comprises the step of including an Anchor command in the hinting command set if the relationship type data field contains a no-relationship data value.

12. The method of claim 8, wherein each control point data field group includes a freedom direction data field, a rounding method data field, a relationship type data field, a control value table ("cvt") category data field, a minimum distance override data field, a minimum distance value data field, and a cvt number data field, and the step of identifying functional data comprises the steps of:

examining the control point data field group associated with the selected control point to determine the number of parent control points associated with the hinting function; and in response to determining that only one parent control point is associated with the hinting function, extracting data from the freedom direction data field, the rounding method data field, the relationship type data field, the cvt category data field, the minimum distance override data field, the minimum distance value data field, and the cvt number data field as the identified functional data.

13. The method of claim 12, wherein the step of generating the hinting command set comprises the step of including a Distance command in the hinting command set if the cvt category data field contains a none data value and the relationship type data field contains a link data value.

14. The method of claim 12, wherein the step of generating the hinting command set comprises the step of including a Link command in the hinting command set if the cvt category data field contains any data value other than a none data value and the relationship type data field contains a link data value.

15. The method of claim 14, wherein the step of generating the hinting command set further comprises the step of including a Stem command if the cvt category data field contains a straight stroke data value and the rounding method data field contains a round-to-grid data value.

16. The method of claim 14, wherein the step of generating the hinting command set further comprises the step of including a Round command if the cvt category data field contains a round stroke data value and the rounding method data field contains a round-to-grid data value.

17. The method of claim 14, wherein the step of generating the hinting command set further comprises the step of including a NoRound command if the cvt category data field contains a round stroke data value and the rounding method data field contains a don't round data value.

18. The method of claim 14, wherein the step of generating the hinting command set further comprises the step of including a HalfGrid command if the cvt category data field contains a non-specific distance data value and the rounding method data field contains a round-to-half-grid data value.

19. The method of claim 14, wherein the step of generating the hinting command set further comprises the step of including a DoubleGrid command if the cvt category data field contains a non-specific distance data value and the rounding method data field contains a round-to-double-grid data value.

20. The method of claim 14, wherein the step of generating the hinting command set further comprises the step of including a DownToGrid command if the cvt category data field contains a non-specific distance data value and the rounding method data field contains a round down-to-grid data value.

21. The method of claim 14, wherein the step of generating the hinting command set further comprises the step of including a UpToGrid command if the cvt category data field contains a non-specific distance data value and the rounding method data field contains a round-up-to-grid data value.

22. The method of claim 12, wherein the step of generating the hinting command set comprises the step of including a Shift command in the hinting command set if the relationship type data field contains a shift data value.

23. The method of claim 8, wherein each control point data field includes a freedom direction data field, a rounding method data field, and a relationship type data field, and the step of identifying functional data comprises the steps of:

examining the control point data field group associated with the selected control point to determine the number of parent control points associated with the hinting function; and in response to determining that only two parent control points are associated with the hinting function, extracting data from the freedom direction data field, the rounding method data field, and the relationship type data field as the identified functional data.

24. The method of claim 23, wherein the step of generating the hinting command set comprises the step of including an Interpolate command in the hinting command set if the relationship type data field contains an interpolate data value and the rounding method data field includes a don't round data value.

25. The method of claim 23, wherein the step of generating the hinting command set comprises the step of including an IPAnchor command in the hinting command set if the relationship type data field contains an interpolate data value and the rounding method data field includes a round-to-grid data value.

26. The method of claim 23, wherein the step of generating the hinting command set further comprises the step of including a HalfGrid command and an Interpolate/Anchor ("IPAnchor") command in the hinting command set if the relationship type data field contains an interpolate data value and the rounding method data field includes a round-to-half-grid data value.

27. The method of claim 23, wherein the step of generating the hinting command set comprises the step of including an Align command in the hinting command set if the relationship type data field contains an align data value.

28. The method of claim 8, wherein each control point data field includes a relationship type data field, and the step of identifying functional data comprises the steps of:

examining the control point data field group associated with the selected control point to determine the number of parent control points associated with the hinting function; and in response to determining that four parent control points are associated with tie hinting function, extracting data from the relationship type data field as the identified functional data.

29. The method of claim 28 wherein the step of generating the hinting command set comprises the step of including an Intersect command in the hinting command set if the relationship type data field contains an intersect data value.

30. The method of claim 8, wherein each control point data field includes a freedom direction data field, a rounding method data field, a relationship type data field, a cvt category data field, a minimum distance override data field, a minimum distance value data field, and a cvt number data field, and the step of identifying functional data comprises the steps of:

examining the control point data field group associated with the selected control point to determine the number of parent control points associated with the hinting function;

in response to determining that no parent control points are associated with the hinting function, extracting data from the freedom direction data field, the rounding method data field, and the relationship type data field as the identified functional data;

in response to determining that only one parent control point is associated with the hinting function, extracting data from the freedom direction data field, the rounding method data field, the relationship type data field, the cvt category data field, the minimum distance override data field, the minimum distance value data field, and the cvt number data field as the identified functional data;

in response to determining that only two parent control points are associated with the hinting function, extracting data from the freedom direction data field, the rounding method data field, and the relationship type data field as the identified functional data; and in response to determining that four parent control points are associated with the hinting function, extracting data from the relationship type data field as the identified functional data.

31. A method for generating hinting commands from functional representations of hinting functions for a glyph, the glyph including a plurality of control points with each control point representing a position relative to a contour of the glyph, each functional representation defining a hinting function associated with a control point of the plurality of control points and at least one parent control point, the method comprising the steps of:

(a) selecting an initial control point from the plurality of control points;

(b) if the initial control point has a parent control point, recursively identifying the ancestor control points of each parent of the initial control point until a final control point is identified, the final control point having no parent control points;

(c) examining each control point identified in step (b) in the reverse order that each control point was identified;

(d) identifying a functional representation defining a hinting function associated with the examined control point and each parent control point of the examined control point if any exist;

(e) converting the functional representation into a hinting language command set; and (f) selecting a next control point from the plurality of control points and continuing at step (b) with the next control point.

32. The method of claim 31, wherein the functional representation is a graphical representation that can be displayed on a display device, and the step of identifying a functional representation comprises identifying a graphical representation associated with the examined control point and each parent control point of the examined control point if any exist.

33. The method of claim 31, wherein the functional representation is functional data within a data structure, and the step of identifying a functional representation comprises reading functional data from the data structure, the functional data identifying a hinting function associated with the examined control point and each parent control point of the examined control point if any exist.

34. A method for translating a hinting command for a glyph into functional data representing a hinting function for the glyph, the glyph including at least one contour, each contour including a plurality of control points, the functional data to be stored in a data structure representing the glyph, the hinting command defining at least one hinting function associated with at least one of the plurality of control points, the method comprising the steps of:

searching the hinting command for a control point;

searching the hinting command for parent control points;

in response to identifying exactly four parent control points in the hinting command, proceeding with steps (a)–(b);

in response to identifying exactly two parent control points in the hinting command, proceeding with steps (a)–(f);

in response to identifying exactly one parent control point in the hinting command, proceeding with steps (a)–(h);

in response to identifying no parent control points in the hinting command, proceeding with steps (a)–(d);

(a) searching the hinting command for a relationship type;

(b) in response to finding a relationship type, storing data representing the relationship type into the data structure in a relationship type data field associated with the control point;

(c) searching the hinting command for a rounding method;

(d) in response to finding a rounding method, storing data representing the rounding method into the data structure in a rounding method data field associated with the control point;

(e) searching the hinting command for a freedom direction;

(f) in response to finding a freedom direction, storing data representing the freedom direction into the data structure in a freedom direction data field associated with the control point;

(g) searching the hinting command for a cvt category; and (h) in response to finding a cvt category, storing data representing the cvt category into the data structure in a cvt category data field associated with the control point.

35. The method of claim 34, further comprising in response to identifying only one parent control point in the hinting command, performing the steps of:

(i) searching the hinting command for a minimum distance override;

(j) in response to finding a minimum distance override, storing data representing the minimum distance override into the data structure in a minimum distance override data field associated with the control point;

(k) searching the hinting command for a minimum distance value;

(l) in response to finding a minimum distance value, storing data representing the minimum distance value into the data structure in a minimum distance value data field associated with the control point;

(m) searching the hinting command for a cvt number;

(n) in response to finding a cvt number, storing data representing the cvt number into the data structure in a cvt number data field associated with the control point.

36. A method for rendering a glyph on an output device using a hinting command, comprising:

providing a glyph data structure corresponding to the glyph having an associated contour data structure corresponding to a contour of the glyph and a plurality of control point data structures corresponding to control points of the glyph, each control point data structure associated with the contour data structure and having a plurality of control point data fields and;

selecting one of the control points as a selected control point and the corresponding control point data structure as a selected control point data structure;

determining a number of parent control points associated with the selected control point;

based upon the number of parent control points associated with the selected control point, identifying selected data fields of the selected control point data structure;

obtaining data from the selected data fields of the selected control point data structure; and based upon the data obtained from the selected data fields, generating a hinting command for rendering the glyph on the output device.

37. The method of claim 36, wherein providing a glyph data structure comprises:

providing a control point data structure having x-direction data fields and y-direction data fields.

38. The method of claim 36, wherein determining a number of parent control points associated with the selected control point comprises:

examining a relationship type data field of the control point data structure to determine the number of parent control points.

39. The method of claim 37, wherein providing a glyph data structure further comprises:

providing a control point data structure having a second set of optional x-direction data fields.

40. The method of claim 38, wherein identifying selected data fields of the selected control point data structure comprises:

determining a type of hinting command based upon the data from the relationship type data field; and identifying the selected data fields based upon the type of hinting command.

41. A computer-readable medium having computer-executable instructions for performing steps comprising:

selecting a control point from a plurality of control points associated with a glyph;

identifying within a data structure, functional data representing a hinting function that is associated with the selected control point and at least one parent control point associated with the control point of the glyph;

generating a hinting command as a function of at least the functional data, the selected control point, and the parent control point; and using the hinting command to render the glyph on an output device.

42. A computer-readable medium having computer-executable instructions for performing steps comprising:

selecting an initial control point from a plurality of control points associated with a glyph;

if the initial control point has a parent control point, then recursively identifying any ancestor control points of the parent control point until a final control point is identified, the final control point having no parent control points;

examining each control point identified in the reverse order that each control point was identified;

identifying a functional representation defining a hinting function associated with the examined control point and each parent control point of the examined control point; and converting the functional representation into a hinting language command.

* * * * *